US011490333B2

(12) United States Patent
Gupta et al.

(10) Patent No.: US 11,490,333 B2
(45) Date of Patent: Nov. 1, 2022

(54) CELLULAR WAKEUP RECEIVER FOR REDUCING POWER CONSUMPTION OF USER EQUIPMENT EMPLOYING LTE-WLAN AGGREGATION

(71) Applicant: Apple Inc., Cupertino, CA (US)

(72) Inventors: Maruti Gupta, Portland, OR (US); Alexander Min, Portland, OR (US)

(73) Assignee: APPLE INC., Cupertino, CA (US)

( * ) Notice: Subject to any disclaimer, the term of this patent is extended or adjusted under 35 U.S.C. 154(b) by 89 days.

(21) Appl. No.: 16/475,613

(22) PCT Filed: Jan. 12, 2017

(86) PCT No.: PCT/US2017/013217
§ 371 (c)(1),
(2) Date: Jul. 2, 2019

(87) PCT Pub. No.: WO2018/132100
PCT Pub. Date: Jul. 19, 2018

(65) Prior Publication Data
US 2019/0327679 A1    Oct. 24, 2019

(51) Int. Cl.
*H04W 52/02* (2009.01)
*H04W 76/27* (2018.01)
*H04W 76/28* (2018.01)

(52) U.S. Cl.
CPC ..... *H04W 52/0229* (2013.01); *H04W 52/028* (2013.01); *H04W 76/27* (2018.02); *H04W 76/28* (2018.02)

(58) Field of Classification Search
CPC .......... H04W 52/0229; H04W 52/028; H04W 76/28; H04W 76/27; H04W 8/24; H04W 8/08; H04W 68/005; H04W 52/0232
(Continued)

(56) References Cited

U.S. PATENT DOCUMENTS 9,872,252 B1 * 1/2018 Ang ................... H04W 52/0229
2014/0112225 A1 * 4/2014 Jafarian ............ H04W 52/0235
370/311
(Continued)

FOREIGN PATENT DOCUMENTS

WO    WO-2018063340 A1 *    4/2018    ........ H04W 52/0229
WO    WO-2018084644 A1 *    5/2018    ........ H04W 36/0069

OTHER PUBLICATIONS 62402816P (provisional application filed Sep. 30, 2016) (Year: 2016).*

(Continued)

*Primary Examiner* — Yemane Mesfin
*Assistant Examiner* — Intekhaab A Siddiquee

(57) ABSTRACT

A cellular wakeup receiver (C-WuRx) for reducing power consumption of a wireless wide area network (WWAN) radio of a user equipment (UE) includes receiver circuitry to receive a wakeup signal from a base station in response to the UE performing link aggregation by which downlink communications from the base station are offloaded to a wireless local area network (WLAN). The C-WuRx also includes processing circuitry to configure the receiver circuitry to periodically monitor at least a portion of a WWAN band for the wakeup signal and process the wakeup signal to cause the WWAN radio to resume receiving the downlink communications from the base station.

20 Claims, 13 Drawing Sheets

(58) Field of Classification Search
USPC .......................................................... 370/311
See application file for complete search history.

(56) References Cited

U.S. PATENT DOCUMENTS

2016/0057703 A1* 2/2016 Benoit .............. H04W 52/0229
370/311
2016/0278013 A1   9/2016 Shellhammer et al.
2016/0345262 A1  11/2016 Jain et al.
2016/0374021 A1* 12/2016 Alpman ............ H04W 52/0229
2018/0115953 A1*  4/2018 Shellhammer ...... H04W 52/028

OTHER PUBLICATIONS 62411433P (Year: 2016).*
62417279P (Year: 2016).*
PCT/US2017/013217, International Search Report and Written Opinion, dated Sep. 15, 2017, 12 pages.

\* cited by examiner

CELLULAR WAKEUP RECEIVER FOR REDUCING POWER CONSUMPTION OF USER EQUIPMENT EMPLOYING LTE-WLAN AGGREGATION

TECHNICAL FIELD

The field of the present disclosure relates generally to a low-power, low-latency Cellular Wake-Up Receiver (C-WuRx) and, more particularly, to a C-WuRx for reducing power consumption during Long Term Evolution (LTE) and Wireless Local Area Network (WLAN) aggregation (LTE-WLAN aggregation, or LWA), which entails a User Equipment device (or simply, a UE) supporting LTE standards for accessing a Wireless Wide Area Network (WWAN) and Wi-Fi standards for accessing a WLAN so as to simultaneously employ both LTE and Wi-Fi links.

BACKGROUND INFORMATION

Wireless mobile communication technology uses various standards and protocols to transmit data between a base station and a wireless mobile device. Wireless communication system standards and protocols can include those of the 3rd Generation Partnership Project (3GPP) relating to LTE; the Institute of Electrical and Electronics Engineers (IEEE) relating to the 802.16 standards, which is commonly known to industry groups as worldwide interoperability for microwave access (WiMAX); and the IEEE relating to the 802.11 standard for WLAN, which is commonly known to industry groups as Wi-Fi®.

In Radio Access Networks (RANs) of LTE systems, the base station can include a RAN node such as a Evolved Universal Terrestrial Radio Access Network (E-UTRAN) Node B (also commonly denoted as evolved Node B, enhanced Node B, eNodeB, or eNB) and Radio Network Controller (RNC) in an E-UTRAN, which communicate with a wireless communication device, i.e., a UE.

RANs use a Radio Access Technology (RAT) to communicate between the RAN node and UE through technologies including Global System for Mobile communications (GSM), Enhanced Data rates for GSM Evolution (EDGE) RAN (GERAN), Universal Terrestrial Radio Access Network (UTRAN), or E-UTRAN, which provide access to communication services through a core network. Thus, each of the RANs operates according to a specific 3GPP RAT.

A core network can be connected to the UE through the RAN node. The core network can include a Serving Gateway (SGW), a Packet Data Network (PDN) Gateway (PGW), an Access Network Detection and Selection Function (ANDSF) server, an enhanced Packet Data Gateway (ePDG), or a Mobility Management Entity (MME).

DETAILED DESCRIPTION OF EMBODIMENTS

Figure 1:
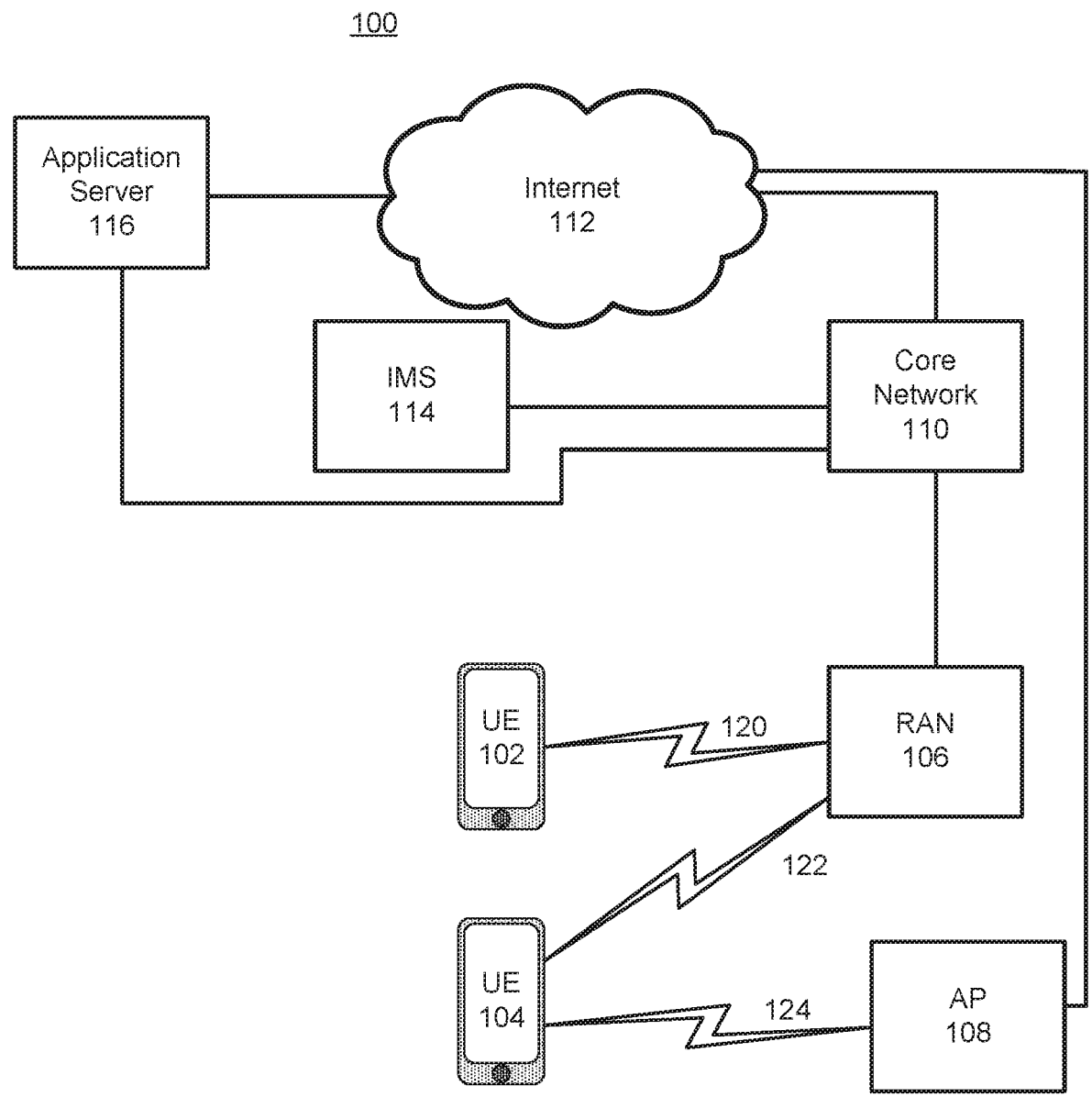
FIG. 1 is a block diagram showing a pair of UEs connected to the Internet through WWAN and WLAN links.

This section of the disclosure is organized into eight subsections. First, an overview of wakeup receiver technology is provided. Second, examples of operating environments and systems are set forth. Third, an example UE including an LP-WUR is described. Fourth, techniques for employing a wakeup receiver in cellular-based networks (e.g., LTE) are described. Fifth, further examples of UEs and eNBs are provided. Sixth, example use cases for the wakeup receiver during LWA are described. Seventh, a summary of example embodiments is set forth. Eighth, and finally, concluding remarks are provided.

I. Overview

Wakeup receivers are low-power radios optimized to receive a specific message or set of messages and, in response, change a state of a main, higher power radio modem (which is also referred to as simply a main radio or a main modem) based on the message. Because wakeup receivers are optimized to receive specific messages, they can consume much less power than a main radio even when the main radio is in its lower power idle state or other Power Saving Mode (PSM).

Conventional wakeup receivers have been implemented in some well-known contention-based protocols, i.e., so-called listen-before-talk operating procedures defined in IEEE 802.11 (Wi-Fi). In contrast, implementing a wakeup receiver for cellular technologies is challenging because these technologies are typically not a contention-based medium; they are scheduled mediums. In scheduled technologies such as LTE, a main radio may use a random access preamble for non-contention-based random access, at which point the main radio regularly expects control channel information that schedules uplink and downlink data.

Previous attempts to reduce power consumption in a cellular radio—while also fulfilling a desire to have the radio reachable by the network within a few hundred milliseconds—have entailed paging. But paging still tends to waste power. For example, LTE networks (including LTE Advanced (LTE-A) networks under a March 2014 release 12 (Rel-12) of the 3GPP standardization effort) expect a UE to be reachable in response to paging, which may entail the UE waking every fixed interval, e.g., every 2.56 seconds (s) to check with the network on whether there is any downlink data waiting for the UE. Many times, the paging mechanism initiates a UE power up and power down simply for a check that indicates no downlink data is available. In these instances, paging unnecessarily consumes power and is therefore not an effective power-saving solution. Furthermore, even when a main cellular modem is in an idle state, it still consumes a relatively large amount of energy, particularly because cellular radios are highly sensitive so as to receive signals in relatively large cells (e.g., up to 1.5 kilometers in diameter) that are much larger than those of non-cellular wireless access technologies (e.g., up to a few hundred meters).

This disclosure describes a C-WuRx for a main cellular modem that, in some embodiments, facilitates a power savings on the order of 100× less power consumption. Accordingly, the description addresses techniques to (1) communicate whether devices are capable of sending or receiving a wakeup signal conveyed within an LTE band, (2) convey such signals within the band, (3) establish what information is signaled, (4) augment exiting paging mechanisms so as to support the wakeup signal functionality and allow UEs in an idle state to reactivate their radios and thereby receive a paging message, and (5) address use cases for the wakeup receiver in the context of aggregation or WWAN and WLAN links.

Additional aspects and advantages will be apparent from the following description of embodiments, which proceeds with reference to the accompanying drawings that have identical reference numbers in multiple drawings to reference the same (or similar) features.

II. Examples of Operating Environments and Associated Systems

FIG. 1 illustrates an architecture of a wireless network with various components of the network, in accordance with some embodiments. A system 100 is shown to include a UE 102 and a UE 104. The UEs 102 and 104 are illustrated as smartphones (i.e., handheld touchscreen mobile computing devices connectable to one or more cellular networks), but can also include personal digital assistants (PDAs), pagers, laptop computers, desktop computers, and the like.

The UEs 102 and 104 are configured to access a RAN 106 via connections 120 and 122, respectively, each of which comprise a physical communications interface or layer; in this example, the connections 120 and 122 are illustrated as an air interface to enable communicative coupling, and can be consistent with cellular communications protocols, such as a GSM protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP LTE protocol, and the like.

In some embodiments described in further detail below, any of the UEs 102 and 104 can comprise an Internet of Things (IoT) UE, which can comprise a network access layer designed for low-power IoT applications utilizing short-lived UE connections.

An IoT UE can utilize technologies such as Machine-to-Machine (M2M) or Machine-Type Communications (MTC) for (machine initiated) exchanging data with an MTC server and/or device via a Public Land Mobile Network (PLMN), Device-to-Device (D2D) communication, sensor networks, or IoT networks. An IoT network describes interconnecting uniquely identifiable embedded computing devices (within the Internet infrastructure) having short-lived connections, in addition to background applications (e.g., keep-alive messages, status updates, etc.) executed by the IoT UE.

The RAN 106 can include one or more access points that enable the connections 120 and 122. These access points (described in further detail below) can be referred to as access nodes, base stations (BSs), NodeBs, eNBs, and so forth, and can comprise ground stations (i.e., terrestrial access points) or satellite access points providing coverage within a geographic area (i.e., a cell). The RAN 106 is shown to be communicatively coupled to a core network 110. The core network 110 can be used to enable a packet-switched data exchange with the Internet 112 in addition to bridging circuit switched calls between the UEs 102 and 104. In some embodiments, the RAN 106 can comprise an E-UTRAN, and the core network 110 can comprise an Evolved Packet Core (EPC) network.

The UE 104 is shown to be configured to access an access point (AP) 108 via connection 124. The connection 124 can comprise a local wireless connection, such as a connection consistent with IEEE 802.11, wherein the AP 108 would comprise a Wi-Fi router. In this example, the AP 108 is shown to be connected to the Internet 112 without connecting to the core network 110.

The Internet 112 is shown to be communicatively coupled to an application server 116. The application server 116 can be implemented as a plurality of structurally separate servers or can be included in a single server. The application server 116 is shown as connected to both the Internet 112 and the core network 110; in other embodiments, the core network 110 connects to the application server 116 via the Internet 112. The application server 116 can also be configured to support one or more communication services (e.g., Voice-over-Internet Protocol (VoIP) sessions, PTT sessions, group communication sessions, social networking services, etc.) for UEs that can connect to the application server 116 via the core network 110 and/or the Internet 112.

The core network 110 is further shown to be communicatively coupled to Internet Protocol (IP) Multimedia Subsystem (IMS) 114. The IMS 114 comprises an integrated network of telecommunications carriers that can enable the use of IP for packet communications, such as traditional telephony, fax, email, Internet access, VoIP, Instant Messaging (IM), videoconference sessions and Video on Demand (VoD), and the like.

Figure 2:
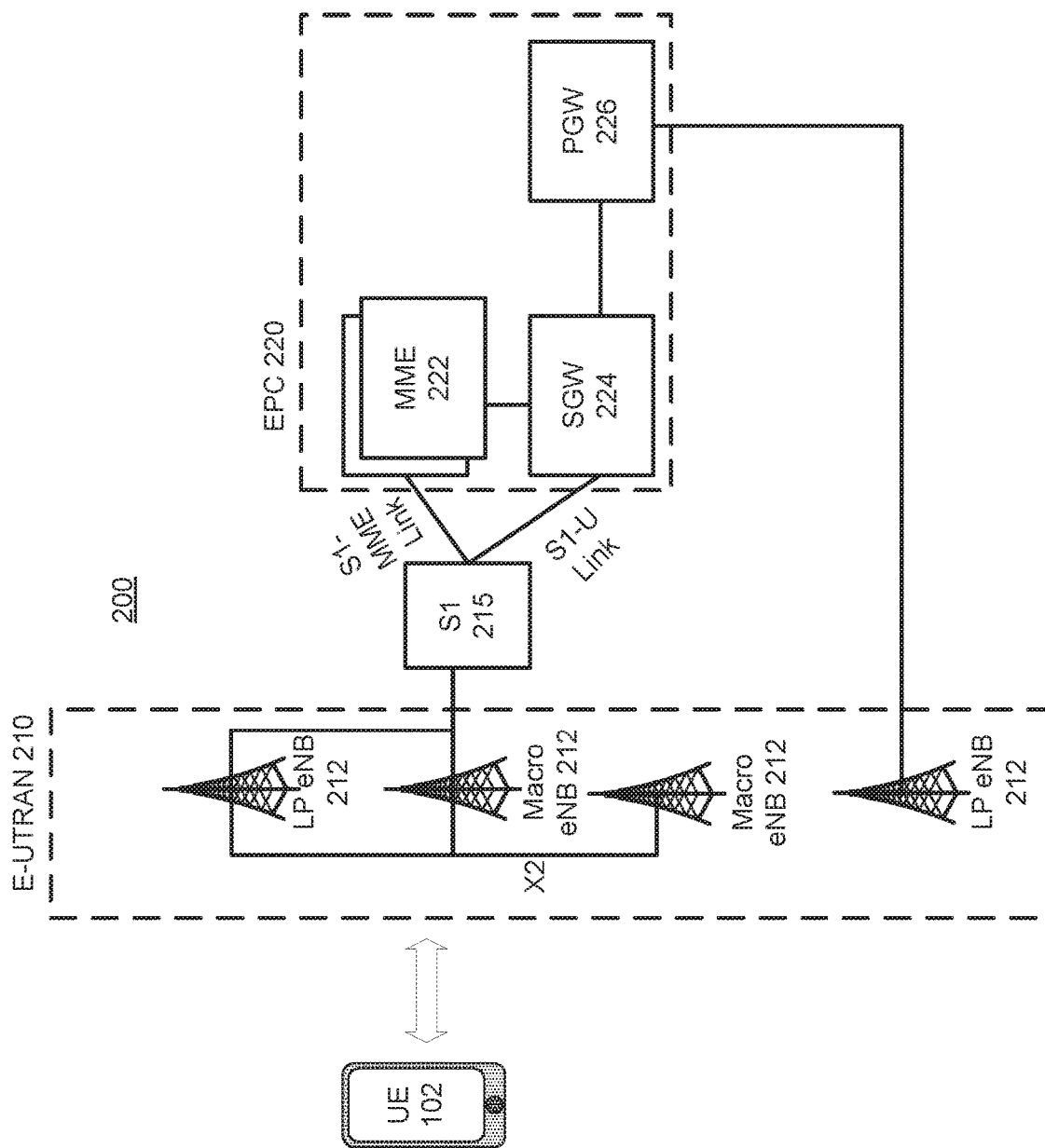
FIG. 2 is a block diagram showing an example of cellular (i.e., LTE) network components.

FIG. 2 illustrates an architecture of components of a cellular network, in accordance with some embodiments. In this example, (sub)system 200 comprises an Evolved Packet System (EPS) on an LTE network, and thus includes an E-UTRAN 210 and an EPC network 220 communicatively coupled via an S1 interface 215. In this illustration, only a portion of the components of E-UTRAN 210 and the EPC network 220 are shown. Some of the elements described below may be referred to as "modules" or "logic." As referred to herein, "modules" or "logic" may describe hardware (such as a circuit), software (such as a program driver), or a combination thereof (such as a programmed microprocessing unit).

The E-UTRAN 210 includes eNBs 212 (which can operate as base stations) for communicating with one or more UEs (e.g., the UE 102). The eNBs 212 are shown in this example to include macro eNBs and low-power (LP) eNBs. Any of the eNBs 212 can terminate the air interface protocol and can be the first point of contact for the UE 102. In some embodiments, any of the eNBs 212 can fulfill various logical functions for the E-UTRAN 210 including but not limited to radio network controller (RNC) functions such as radio bearer management, uplink and downlink dynamic radio resource management and data packet scheduling, and mobility management. The eNBs in EPS/LTE networks, such as the eNBs 212, do not utilize a separate controller (i.e., an RNC) to communicate with the EPC network 220; in other embodiments utilizing other specification protocols, RANs can include an RNC to enable communication between BSs and core networks.

In accordance with some embodiments, the UE 102 can be configured to communicate using Orthogonal Frequency-Division Multiplexing (OFDM) communication signals with any of the eNBs 212 over a multicarrier communication channel in accordance various communication techniques, such as an Orthogonal Frequency-Division Multiple Access (OFDMA) communication technique or a Single Carrier Frequency Division Multiple Access (SC-FDMA) communication technique, although the scope of the embodiments is not limited in this respect. The OFDM signals can comprise a plurality of orthogonal subcarriers.

In accordance with some embodiments, the UE 102 can be configured to determine a synchronization reference time based on reception of one or more signals from any of the eNBs 212. The UE 102 can also be configured to support D2D communication with other UEs using OFDMA, SC-FDMA, or other multiple access schemes.

The S1 interface 215 is the interface that separates the E-UTRAN 210 and the EPC network 220. It is split into two parts: the S1-U, which carries traffic data between the eNBs 212 and the SGW 224, and the S1-MME, which is a signaling interface between the eNBs 212 and the MMEs 222. An X2 interface is the interface between eNBs 212. The X2 interface can comprise two parts (not shown): the X2-C and X2-U. The X2-C is the control plane interface between the eNBs 212, while the X2-U is the user plane interface between the eNBs 212.

With cellular networks, low-power cells can be used to extend coverage to indoor areas where outdoor signals do not reach well, or to add network capacity in areas with very dense phone usage, such as train stations. As used herein, the term "LP eNB" refers to any suitable relatively low-power eNB for implementing a smaller cell (i.e., smaller than a macro cell) such as a femtocell, a picocell, or a microcell at the edge of the network. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, an LP eNB might be a femtocell eNB since it is coupled through the packet data network gateway (PGW) 226. Similarly, a picocell is a wireless communication system typically covering a small area, such as in-building (offices, shopping malls, train stations, etc.) or, more recently, in-aircraft. A picocell eNB can generally connect through the X2 link to another eNB, such as a macro eNB, through its base station controller (BSC) functionality. Thus, an LP eNB can be implemented with a picocell eNB since it is coupled to a macro eNB via an X2 interface. Picocell eNBs or other LP eNBs can incorporate some or all functionality of a macro eNB. In some cases, this can be referred to as an AP BS or enterprise femtocell.

In some embodiments, a downlink resource grid can be used for downlink transmissions from any of the eNBs 212 to the UE 102, while uplink transmission from the UE 102 to any of the eNBs 212 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quantity of resources that currently can be allocated. There are several different physical downlink channels that are conveyed using such resource blocks.

The Physical Downlink Shared Channel (PDSCH) carries user data and higher-layer signaling to the UE 102. The Physical Downlink Control Channel (PDCCH) carries information about the transport format and resource allocations related to the PDSCH channel, among other things. It also informs the UE 102 about the transport format, resource allocation, and Hybrid Automatic Repeat Request (HARQ) information related to the uplink shared channel. Typically, downlink scheduling (assigning control and shared channel resource blocks to the UE 102 within a cell) is performed at any of the eNBs 212 based on channel quality information fed back from the UE 102 to any of the eNBs 212, and then the downlink resource assignment information is sent to the UE 102 on the PDCCH used for (assigned to) the UE.

The PDCCH uses Control Channel Elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as Resource Element Groups (REGs). Four Quadrature Phase Shift Keying (QPSK) symbols are mapped to each REG. The PDCCH can be transmitted using one or more CCEs, depending on the size of the Downlink Control Information (DCI) and the channel condition. There can be four or more different PDCCH formats defined in LTE with different numbers of CCEs (e.g., aggregation level, L=1, 2, 4, or 8).

The EPC network 220 includes the MMEs 222, the S-GW 224, and a PGW 226. The MMEs 222 are similar in function to the control plane of legacy Serving General Packet Radio Service (GPRS) Support Nodes (SGSN). The MMEs 222 manage mobility aspects in access such as gateway selection and tracking area list management. The S-GW 224 terminates the interface toward the E-UTRAN 210 and routes data packets between the E-UTRAN 210 and the EPC network 220. In addition, the S-GW 224 can be a local mobility anchor point for inter-eNB handovers and can also provide an anchor for inter-3GPP mobility. Other responsibilities can include lawful intercept, charging, and some policy enforcement.

The S-GW 224 and the MMEs 222 can be implemented in one physical node or separate physical nodes. The PGW 226 terminates an SGi interface toward the PDN. The PGW 226 routes data packets between the EPC network 220 and external networks (e.g., the Internet), and can be a key node for policy enforcement and charging data collection. The PGW 226 and S-GW 224 can be implemented in one physical node or separated physical nodes.

The UE 102 performs cell selection upon power-up and cell reselections throughout its operation. The UE 102 searches for a cell provided by E-UTRAN 210 (e.g., a macro cell or a picocell). During the cell reselection process, the UE 102 can measure reference signal strength for each neighboring cell (e.g., Reference Signal Received Power/ Reference Signal Received Quality (RSRP/RSRQ)) and select a cell based on this measurement (e.g., select a cell with the highest RSRP value). After the UE 102 selects a cell, it can verify the accessibility of the cell by reading the Master Information Block (MIB). If the UE 102 fails to read the MIB of the selected cell, it can discard the selected cell and repeat the above process until a suitable cell is discovered.

An RRC state indicates whether an RRC layer of the UE 102 is logically connected to an RRC layer of the E-UTRAN 210. After the UE 102 is communicatively coupled to a cell (e.g., the UE can listen to eNB broadcast channels), its RRC state is RRC_IDLE. When the UE 102 has data packets to transmit or receive, its RRC state becomes connected (RRC_CONNECTED). The UE 102, when in an RRC_IDLE state, can associate itself to different cells.

When a large number of wireless devices are present in a network, there may be scenarios where an end device does not have direct connectivity to an eNB(s) 212. For example, connectivity resources may be limited or devices may comprise coverage-constrained devices (e.g., devices operating primarily for MTC or M2M communications (e.g., sensor devices, controller devices, etc.) may have limited coverage and processing capabilities (similarly, devices may operate in a coverage constrained mode to limit power/resource consumption)). The connectivity for such a device may be provided using a multi-hop transmission path for uplink/ downlink paths to/from the eNB(s) 212. In other examples, a multi-hop transmission path may be more power efficient or have less of a network traffic load compared to a direct UE-eNB path, and thus the multi-hop transmission path is utilized.

III. Example UE Including C-WuRx

Figure 3:
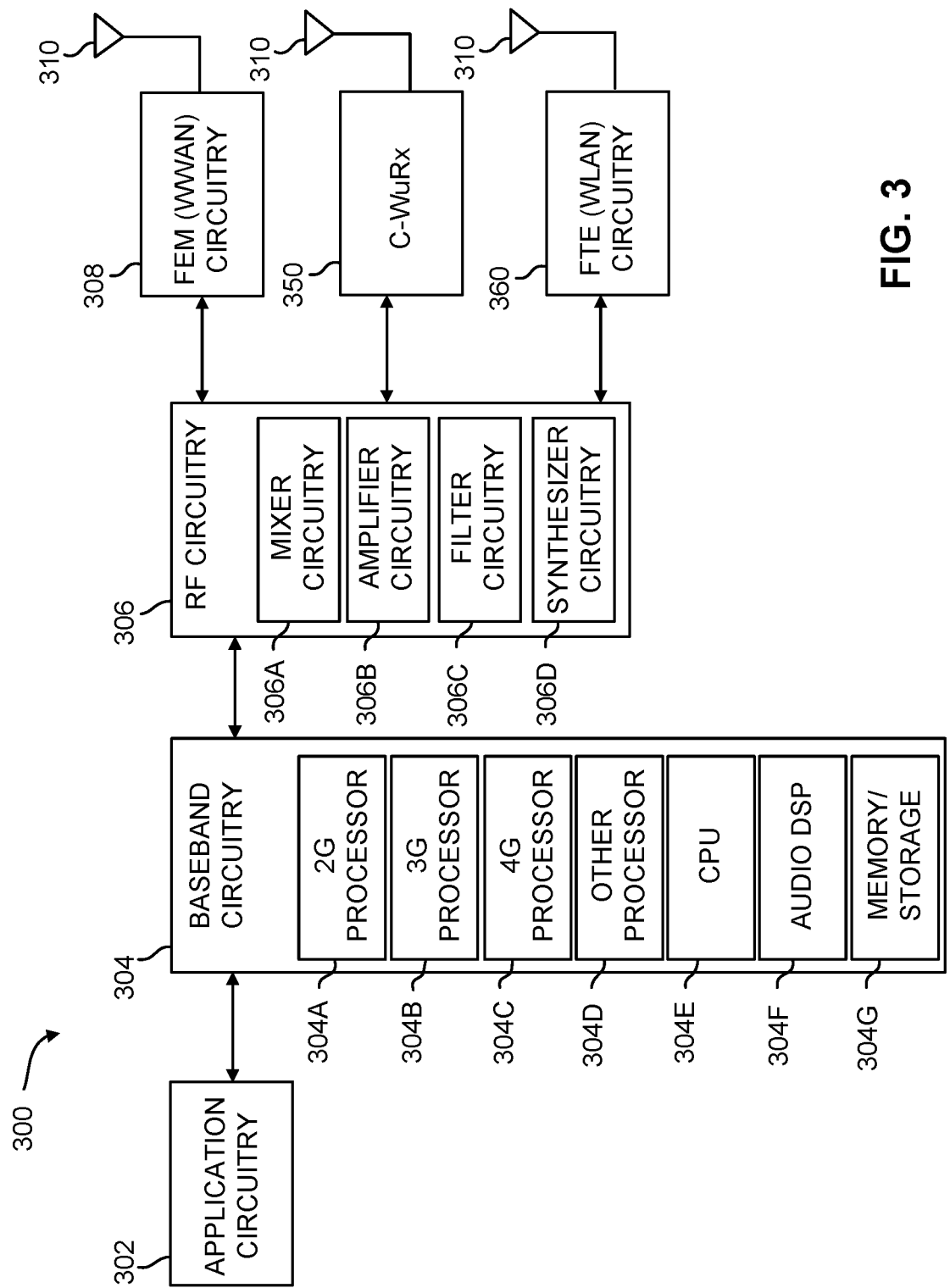
FIG. 3 is a block diagram of a UE having a C-WuRx, which is also referred to as a low-power wakeup radio (LP-WUR).

Embodiments described herein may be implemented into a system using any suitably configured hardware and/or software. FIG. 3 is a block diagram illustrating, for one embodiment, example components of a UE or mobile station (MS) device 300. In some embodiments, mobile devices or other devices described herein can be part of a portable wireless communication device, such as a PDA, a laptop or portable computer with wireless communication capability, a web tablet, a wireless telephone, a smartphone, a wireless headset, a pager, a wearable mobile computing device (e.g., a mobile computing device included in a wearable housing), an instant messaging device, a digital camera, an access point, a television, a medical device (e.g., a heart rate monitor, a blood pressure monitor, etc.), or other device that can receive and/or transmit information wirelessly. In some embodiments, the mobile device or other device can include one or more of a keyboard, a display, a non-volatile memory port, multiple antennas, a graphics processor, an application processor, speakers, and other mobile device elements. The display can be a liquid crystal display (LCD) screen including a touch screen.

In some embodiments, the UE device 300 may include application circuitry 302, baseband circuitry 304, Radio Frequency (RF) circuitry 306, front-end module (FEM) circuitry 308 for WWAN, a C-WuRx 350, FEM circuitry 360 for WLAN, and one or more associated antennas 310, coupled together at least as shown. In some embodiments, the UE device 300 may include additional elements such as, for example, memory/storage, display, camera, sensor, and/ or input/output (I/O) interface.

The application circuitry 302 may include one or more application processors. For example, the application circuitry 302 may include circuitry such as one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

The baseband circuitry 304 may include one or more single-core or multi-core processors. The baseband circuitry 304 may include one or more baseband processors and/or control logic. The baseband circuitry 304 may be configured to process baseband signals received from a receive signal path of the RF circuitry 306. The baseband circuitry 304 may also be configured to generate baseband signals for a transmit signal path of the RF circuitry 306. The baseband processing circuitry 304 may interface with the application circuitry 302 for generation and processing of the baseband signals, and for controlling operations of the RF circuitry 306. For example, in some embodiments, the baseband circuitry 304 may include at least one of a second generation (2G) baseband processor 304A, a third generation (3G) baseband processor 304B, a fourth generation (4G) baseband processor 304C, other baseband processor(s) 304D for other existing generations, and generations in development or to be developed in the future (e.g., fifth generation (5G), 6G, etc.). The baseband circuitry 304 (e.g., at least one of baseband processors 304A-304D) may handle various radio control functions that enable communication with one or more radio networks via the RF circuitry 306. The radio control functions may include signal modulation/demodulation, encoding/decoding, radio frequency shifting, other functions, and combinations thereof. In some embodiments, modulation/demodulation circuitry of the baseband circuitry 304 may be programmed to perform Fast-Fourier Transform (FFT), precoding, constellation mapping/demapping functions, other functions, and combinations thereof. In some embodiments, encoding/decoding circuitry of the baseband circuitry 304 may be programmed to perform convolutions, tail-biting convolutions, turbo, Viterbi, Low Density Parity Check (LDPC) encoder/decoder functions, other functions, and combinations thereof. Embodiments of modulation/ demodulation and encoder/decoder functions are not limited to these examples, and may include other suitable functions.

In some embodiments, the baseband circuitry 304 may include elements of a protocol stack such as, for example, elements of an E-UTRAN protocol including, for example, Physical (PHY), Media Access Control (MAC), Radio Link Control (RLC), Packet Data Convergence Protocol (PDCP), and/or RRC elements. A Central Processing Unit (CPU) 304E of the baseband circuitry 304 may be programmed to run elements of the protocol stack for signaling of the PHY, MAC, RLC, PDCP, and/or RRC layers. In some embodiments, the baseband circuitry 304 may include one or more audio Digital Signal Processor(s) (DSP) 304F. The audio DSP(s) 304F may include elements for compression/decompression and echo cancellation. The audio DSP(s) 304F may also include other suitable processing elements.

The baseband circuitry 304 may further include memory/storage 304G. The memory/storage 304G may include data and/or instructions for operations performed by the processors of the baseband circuitry 304 stored thereon. In some embodiments, the memory/storage 304G may include any combination of suitable volatile memory and/or non-volatile memory. The memory/storage 304G may also include any combination of various levels of memory/storage including, but not limited to, read-only memory (ROM) having embedded software instructions (e.g., firmware), random access memory (e.g., Dynamic Random Access Memory (DRAM)), cache, buffers, etc. In some embodiments, the memory/storage 304G may be shared among the various processors or dedicated to particular processors.

Components of the baseband circuitry 304 may be suitably combined in a single chip, a single chipset, or disposed on a same circuit board in some embodiments. In some embodiments, some or all of the constituent components of the baseband circuitry 304 and the application circuitry 302 may be implemented together, such as, for example, on a System On a Chip (SOC).

In some embodiments, the baseband circuitry 304 may provide for communication compatible with one or more radio technologies. For example, in some embodiments, the baseband circuitry 304 may support communication with an E-UTRAN and/or other Wireless Metropolitan Area Networks (WMAN), a WLAN, a Wireless Personal Area Network (WPAN). Embodiments in which the baseband circuitry 304 is configured to support radio communications of more than one wireless protocol may be referred to as multi-mode baseband circuitry.

The RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. The RF circuitry 306 may include a receive signal path which may include circuitry to down-convert RF signals received from the FEM circuitry 308, and provide baseband signals to the baseband circuitry 304. The RF circuitry 306 may also include a transmit signal path which may include circuitry to up-convert baseband signals provided by the baseband circuitry 304, and provide RF output signals to the FEM circuitry 308 for transmission.

In some embodiments, the RF circuitry 306 may include a receive signal path and a transmit signal path. The receive signal path of the RF circuitry 306 may include mixer circuitry 306A, amplifier circuitry 306B, and filter circuitry 306C. The transmit signal path of the RF circuitry 306 may include filter circuitry 306C and mixer circuitry 306A. The RF circuitry 306 may further include synthesizer circuitry 306D configured to synthesize a frequency for use by the mixer circuitry 306A of the receive signal path and the transmit signal path. In some embodiments, the mixer circuitry 306A of the receive signal path may be configured to down-convert RF signals received from the FEM circuitry 308 based on the synthesized frequency provided by synthesizer circuitry 306D. The amplifier circuitry 306B may be configured to amplify the down-converted signals.

The filter circuitry 306C may include a Low-Pass Filter (LPF) or Band-Pass Filter (BPF) configured to remove unwanted signals from the down-converted signals to generate output baseband signals. Output baseband signals may be provided to the baseband circuitry 304 for further processing. In some embodiments, the output baseband signals may include zero-frequency baseband signals, although this is not a requirement. In some embodiments, the mixer circuitry 306A of the receive signal path may comprise passive mixers, although the scope of the embodiments is not limited in this respect.

In some embodiments, the mixer circuitry 306A of the transmit signal path may be configured to up-convert input baseband signals based on the synthesized frequency provided by the synthesizer circuitry 306D to generate RF output signals for the FEM circuitry 308. The baseband signals may be provided by the baseband circuitry 304 and may be filtered by filter circuitry 306C. The filter circuitry 306C may include a LPF, although the scope of the embodiments is not limited in this respect. In some embodiments, the mixer circuitry 306A of the receive signal path and the mixer circuitry 306A of the transmit signal path may include two or more mixers, and may be arranged for quadrature downconversion and/or upconversion, respectively. In some embodiments, the mixer circuitry 306A of the receive signal path and the mixer circuitry 306A of the transmit signal path may include two or more mixers and may be arranged for image rejection (e.g., Hartley image rejection). In some embodiments, the mixer circuitry 306A of the receive signal path and the mixer circuitry 306A may be arranged for direct downconversion and/or direct upconversion, respectively. In some embodiments, the mixer circuitry 306A of the receive signal path and the mixer circuitry 306A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 306 may include Analog-to-Digital Converter (ADC) and Digital-to-Analog Converter (DAC) circuitry, and the baseband circuitry 304 may include a digital baseband interface to communicate with the RF circuitry 306.

In some dual-mode embodiments, separate radio integrated circuit (IC) circuitry may be provided for processing signals for each spectrum, although the scope of the embodiments is not limited in this respect.

In some embodiments, the synthesizer circuitry 306D may include one or more of a fractional-N synthesizer and a fractional N/N+1 synthesizer, although the scope of the embodiments is not limited in this respect as other types of frequency synthesizers may be suitable. For example, synthesizer circuitry 306D may include a delta-sigma synthesizer, a frequency multiplier, a synthesizer comprising a phase-locked loop with a frequency divider, other synthesizers and combinations thereof.

The synthesizer circuitry 306D may be configured to synthesize an output frequency for use by the mixer circuitry 306A of the RF circuitry 306 based on a frequency input and a divider control input. In some embodiments, the synthesizer circuitry 306D may be a fractional N/N+1 synthesizer.

In some embodiments, frequency input may be provided by a Voltage Controlled Oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

The synthesizer circuitry 306D of the RF circuitry 306 may include a divider, a Delay-Locked Loop (DLL), a multiplexer and a phase accumulator. In some embodiments, the divider may include a Dual Modulus Divider (DMD), and the phase accumulator may include a Digital Phase Accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 306D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

The FEM circuitry 308 may include a receive signal path which may include circuitry configured to operate on RF signals received from one or more antennas 310, amplify the received signals, and provide the amplified versions of the received signals to the RF circuitry 306 for further processing. The FEM circuitry 308 may also include a transmit signal path which may include circuitry configured to amplify signals for transmission provided by the RF circuitry 306 for transmission by at least one of the one or more antennas 310.

In some embodiments, the FEM circuitry 308 may include a TX/RX switch configured to switch between a transmit mode and a receive mode operation. The FEM circuitry 308 may include a receive signal path and a transmit signal path. The receive signal path of the FEM circuitry 308 may include a Low-Noise Amplifier (LNA) to amplify received RF signals and provide the amplified received RF signals as an output (e.g., to the RF circuitry 306). The transmit signal path of the FEM circuitry 308 may include a Power Amplifier (PA) configured to amplify input RF signals (e.g., provided by RF circuitry 306), and one or more filters configured to generate RF signals for subsequent transmission (e.g., by one or more of the one or more antennas 310).

In some embodiments, the MS device 300 may include additional elements such as, for example, memory/storage, a display, a camera, one or more sensors, an Input/Output (I/O) interface, other elements, and combinations thereof.

In some embodiments, the MS device 300 may be configured to perform one or more processes, techniques, and/or methods as described herein, or portions thereof.

In some embodiments, the UE 300 comprises a plurality of power saving mechanisms. If the UE 300 is in an RRC_CONNECTED state, where it is still connected to the eNB because it expects to receive traffic shortly, then it may enter a state known as DRX mode after a period of inactivity. During this state, the device may power down for brief intervals of time and thus save power.

If there is no data traffic activity for an extended period of time, then the UE 300 may transition off to an RRC_IDLE state, where it disconnects from the network and does not perform operations such as channel quality feedback, handover, and the like. The UE 300 goes into a very low power state and it performs paging where it periodically wakes up to listen to the network and then powers down again. The device cannot receive data in this state; in order to receive data, it transitions back to RRC_CONNECTED state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

As discussed above, the UE device 300 may comprise a network access layer designed for low-power applications utilizing short-lived UE connections, such as a low-power IoT UE (e.g., an MTC or M2M device). IoT UEs may be utilized in applications having a potentially high latency in downlink transmissions (i.e., the device may power down completely for large periods of time to save power and may be unavailable to the network).

In this embodiment, the C-WuRx 350 is a low-power radio separate from the FEM circuitry 308. The C-WuRx 350 may remain awake continuously (or at high-frequency intervals) and monitor for a wakeup signal, allowing the FEM circuitry 308 to remain powered down in the absence of downlink data. When the C-WuRx 350 detects the wakeup signal, the C-WuRx 350 may be configured to wake up the FEM circuitry 308 to receive incoming downlink data.

In some embodiments, a simple radio waveform (e.g., a narrow-band wakeup signal comprising an On-Off Key (OOK) modulated tone) may be used to signal pending downlink data for the UE 300, rather than a highly complex OFDM having the precise synchronization characteristics of a standard LTE channel. This simple waveform allows for the C-WuRx 350 to remain awake and still consume less power than the FEM circuitry 308, thereby significantly increasing the battery life of the UE 300. Since its waveform may be different from that of LTE, processing circuitry of the C-WuRx may also be different and provide for reduced power consumption.

IV. Wakeup Receiver Signaling and Functionality

Figure 4:
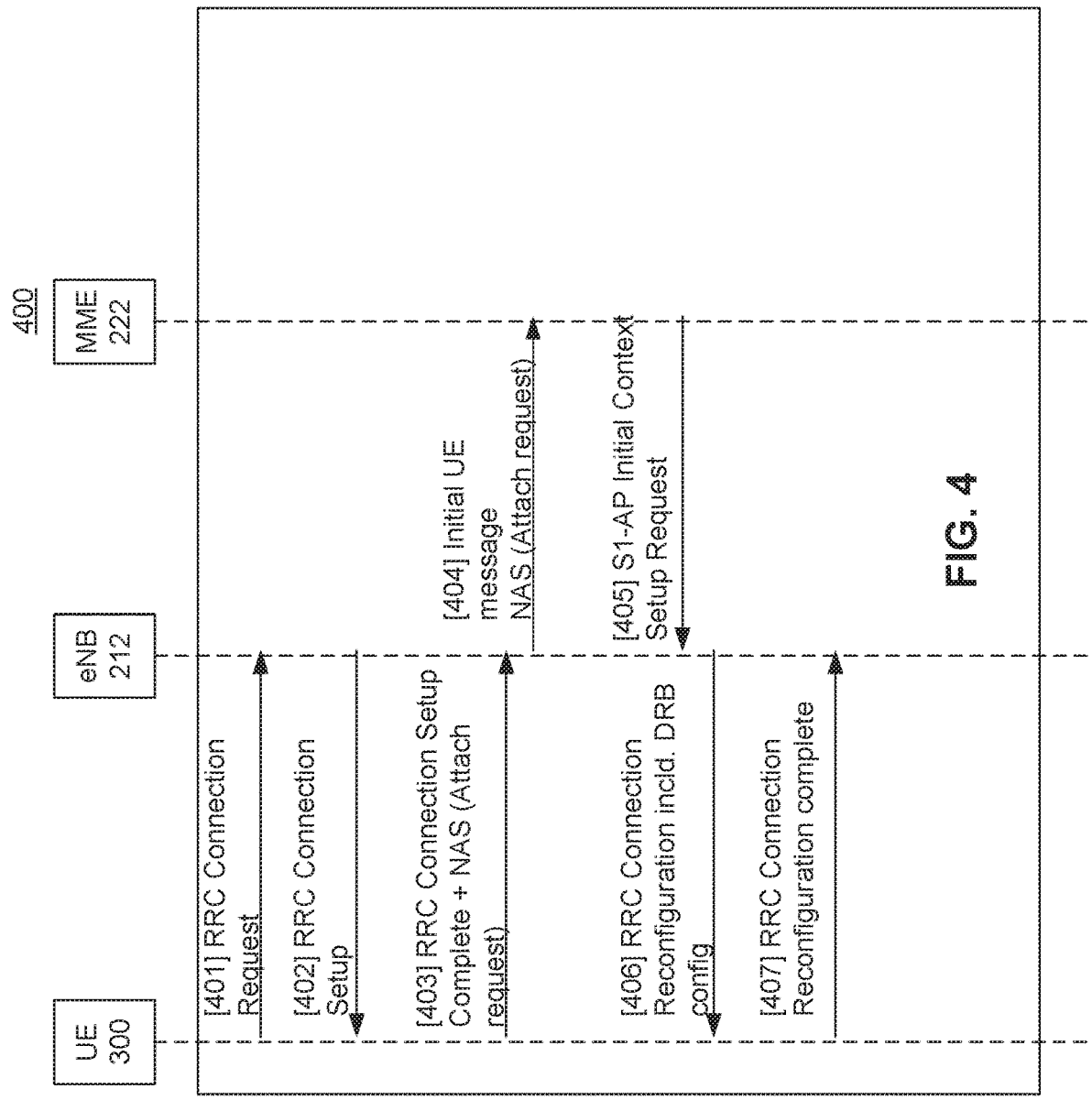
FIG. 4 is a sequence diagram of a connectivity procedure performed by the UE of FIG. 3 when accessing the LTE network of FIG. 2.

FIG. 4 is a flow diagram of a connectivity procedure for a UE in accordance with some embodiments. Process and logical flow diagrams as illustrated herein provide examples of sequences of various process actions. Although shown in a particular sequence or order, unless otherwise specified, the order of the actions can be modified. Thus, the described and illustrated implementations should be understood only as examples, and the illustrated processes can be performed in a different order, and some actions can be performed in parallel. Additionally, one or more actions can be omitted in various embodiments; thus, not all actions are executed in every implementation. Other process flows are possible.

In this embodiment, an RRC signaling mechanism is used to exchange LP-WUR capability information of the UE 300 with other components of an LTE network. A process 400 is illustrated as an attachment messaging sequence, and is shown to include several messages exchanged between network components for establishing an RRC connection; in some embodiments, other messages may be exchanged in addition to the messages described below.

The UE 300 sends an RRC Connection Request message 401 to the eNB 212. The eNB 212 sends an RRC Connection Setup message 402 to the UE 300; this message 402 includes configuration information for a Signal Radio Bearer (SRB).

The UE 300 sends an RRC Connection Setup Complete message 403, which includes a Non-Access Stratum (NAS) service request for attaching to an EPC, to the eNB 212. The message 403 can include data indicating the UE 300 has LP-WUR capability (i.e., the UE 300 includes the C-WuRx 350).

The eNB 212 forwards the service request message (shown as a message 404, which also includes the data indicating that the UE 300 includes the C-WuRx 350) to a network control entity of an EPC (in this example, the MME 222). In some embodiments, if rejection of the connection request is taken care of by another message, uplink (UL) grant can simply be sent in the PDCCH and message 404 is not sent.

The MME 222 sends an initial context setup request message 405 to the eNB 212. The message 405 can includes information from an authentication security routine. The eNB 212 sends an RRC Connection Reconfiguration message 406, which includes configuration information for one or more data radio bearers (DRBs), to the UE 300. The UE 300 sends an RRC Connection Reconfiguration Complete message 407 to the eNB 212 to establish one or more DRBs.

Thus, the MME 222 and the eNB 212 are aware that the UE 300 has LP-WUR capabilities, and may be reached through LP-WUR signals when the FEM circuitry 308 of the UE 300 is in an RRC_IDLE state. Other embodiments may signal this information to components of the network (e.g., via Feature Group Indicator (FGI) bits in the UE Capability Information response).

Figure 5:
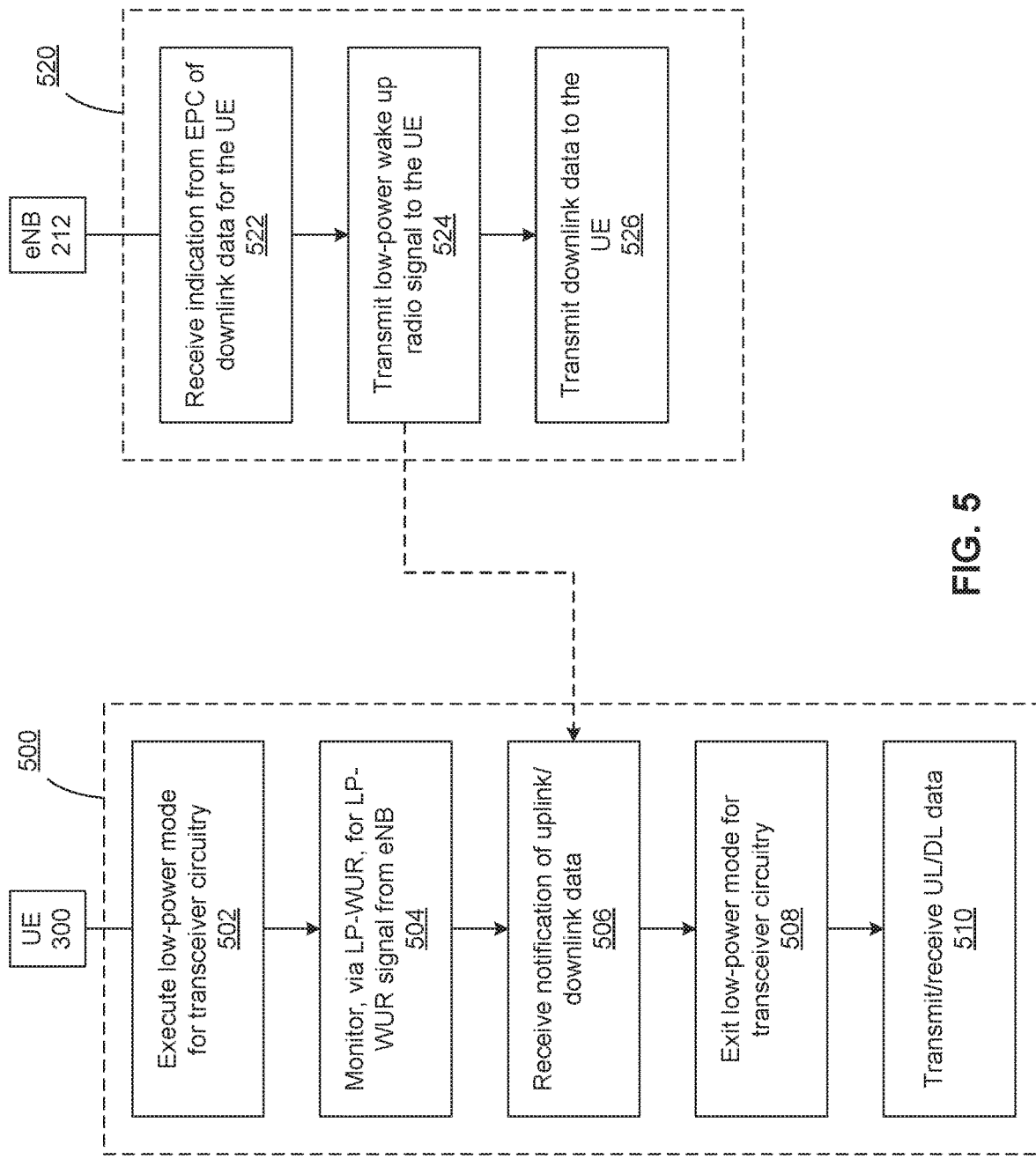
FIG. 5 is a pair of flow charts showing processes, performed by the UE of FIG. 3 and an eNB of FIG. 2, for initiating and terminating a low-power mode in the UE.

FIG. 5 illustrates a process for initiating and terminating the UE low-power mode in accordance with some embodiments. A process 500 is shown to be executed via the UE 300 comprising the C-WuRx 350, and a process 520 is shown to be executed via the eNB 212. The process 500 includes an operation for the UE 300 to execute a low-power mode (shown as block 502). As discussed above, if there is no data traffic activity for an extended period of time, then the UE 300 may transition off to an RRC_IDLE state, where it disconnects from the network and does not perform operations such as channel quality feedback, handover, and the like. The UE 300 goes into a very low power state wherein transceiver circuitry such as the FEM circuitry 308 is powered off.

For UEs utilized in an IoT/MTC application, high latency (e.g., every few minutes to hours) in uplink/downlink transmissions may be expected (i.e., the device may power down completely for large periods of time to save power and may be unavailable to the network). The process 500 includes an operation for the C-WuRx 350 to monitor (either continuously or at an interval to ensure a minimum latency threshold) for an LP-WUR signal from the eNB 212 (shown as block 504).

The process 520 includes an operation for the eNB 212 to receive an indication from the EPC that downlink data is present for the UE 300 (shown as block 522). Because the eNB 212 is aware that the UE 300 includes the C-WuRx 350, the eNB 212 executes an operation to transmit a low-power wakeup radio signal to the UE 300 (shown as block 524) rather than executing a legacy paging process. The eNB 212 subsequently transmits said downlink data (shown as block 526) (e.g., after a predetermined time period, after receiving an indication from the UE 300 that its receiver circuitry is powered on, etc.).

As discussed above, the low-power wake up radio signal transmitted from the eNB 212 may comprise a non-OFDM signal with an extremely simple modulation scheme such as OOK. In some embodiments, the low-power wake up radio signal may include an identifying preamble pattern long enough to ensure that it can be recognized as a LP-WUR signal by the C-WuRx 350 of the UE 300. In some embodiments, the low-power wake up radio signal may include a UE Identifier, such as a System Architecture Evolution (SAE)-Temporary Mobile Subscriber Identity (S-TMSI), which may be used to uniquely identify the UE. In some embodiments, the low-power wake up radio signal may be transmitted so that it does not interfere with the reception of Primary and Secondary Synchronization Signals sent by the eNB to the UEs, pilot signals, or any of the control information. In some embodiments, the low-power wake up radio signal may carry some information to the UE 300 to assist in the fast network entry (e.g. preamble for non-contention based random access).

The process 500 includes an operation for the UE 300 to receive an indication of either uplink data or downlink data (i.e., via the low-power wakeup radio signal) (shown as block 506). The transceiver circuitry (e.g., the FEM circuitry 308 of the UE 300) is subsequently powered on (shown as block 508) and the uplink/downlink data is subsequently transmitted/received (shown as block 510).

Figure 6:
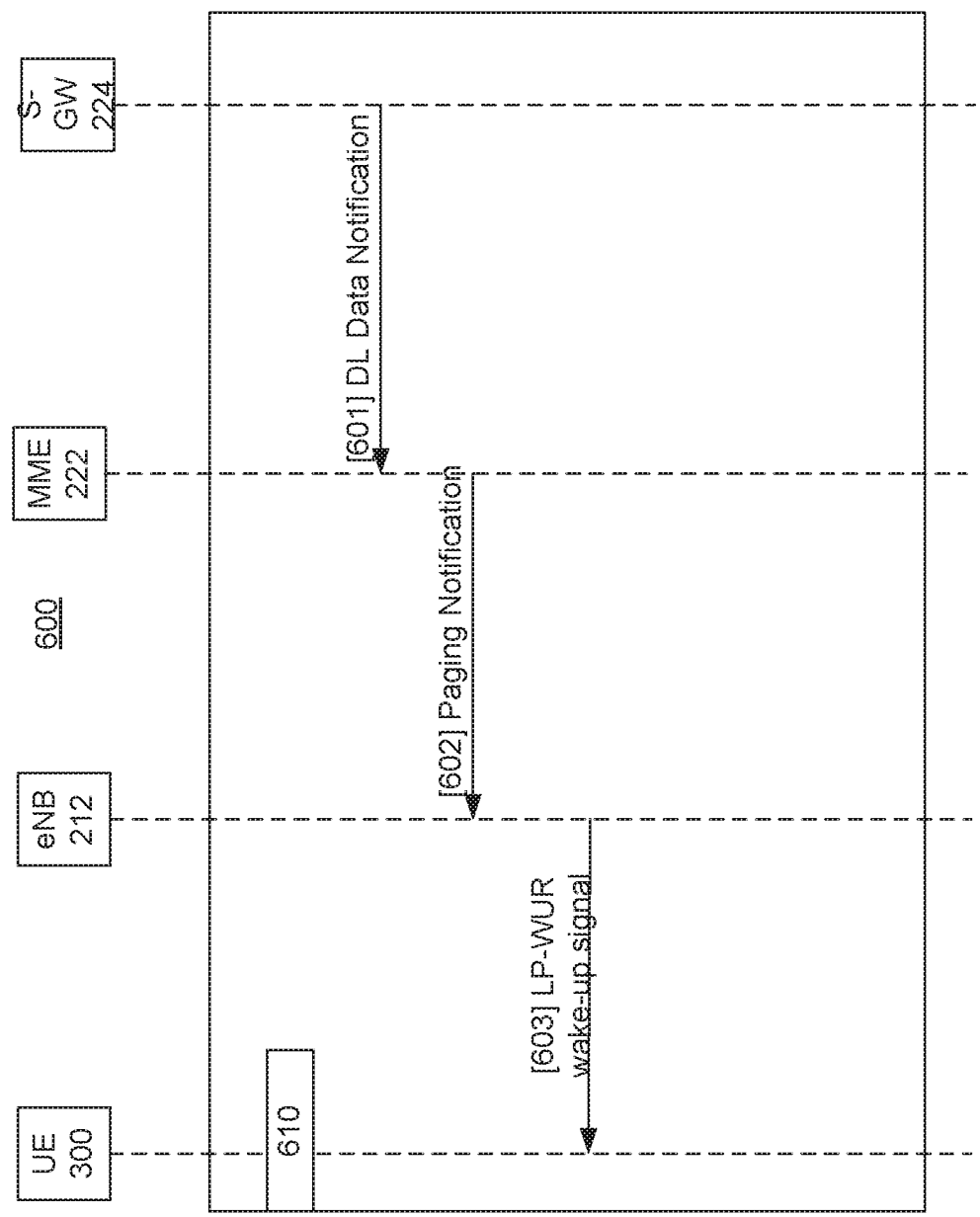
FIG. 6 is a sequence diagram showing a process of the LTE network of FIG. 2 waking the UE of FIG. 3 through its C-WuRx capabilities prior to delivering downlink data.

FIG. 6 is a flow diagram for a process to send downlink data to a UE having LP-WUR capabilities in accordance with some embodiments. A process 600 is executed while the UE 300 is executing an RRC_IDLE state 610. During this state, there is no active connection between the eNB 212 and the UE 300, and thus, the eNB 212 does not have information that the UE 300 is within its cell range.

The process 600 includes an operation for the S-GW 224 to transmit a downlink data notification to the MME 222 (shown as operation 601). The MME 222 determines where the UE 300 may currently located (i.e., its tracking area (TA)) and pages all eNBs that the UE 300 (UE (identified, for example, via its IMSI or S-TMSI) has downlink data (shown as operation 602); in this embodiment, the eNB 212 receives this paging notification because the UE 300 is within its cell range.

For UEs without LP-WUR capabilities, the MME 222 may send an S1-AP paging message (via, for example, the S1 interface 215 of FIG. 2) to eNB 212 in order initiate a UE legacy wakeup process. In this embodiment, however, the MME 222 sends a paging notification including data indicating the UE 300 has LP-WUR capabilities. The eNB 212 subsequently sends a LP-WUR wakeup signal (shown as operation 603) rather than a legacy paging message to initiate any of the UE wakeup processes discussed above.

Figure 7A:
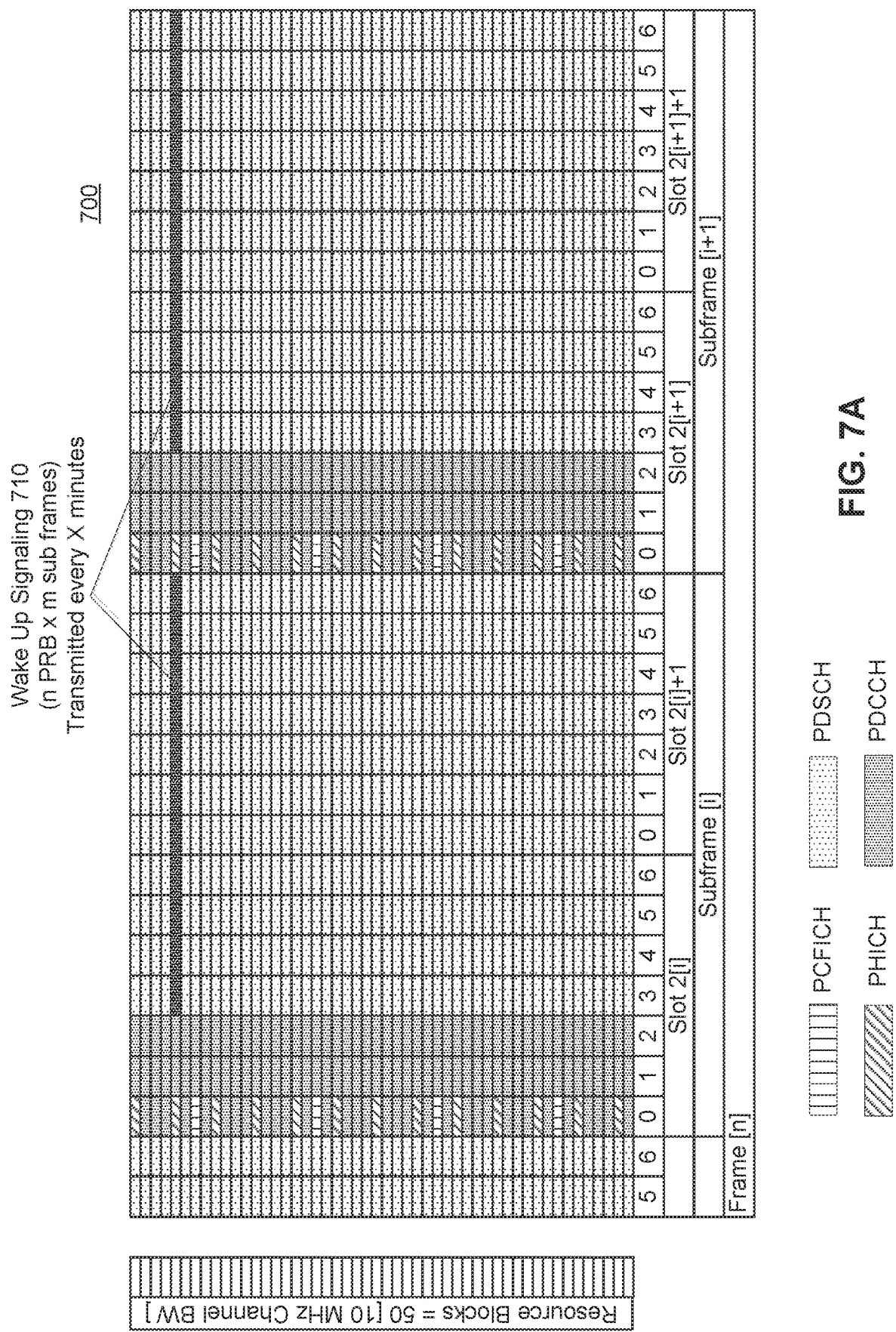
FIGS. 7A and 7B are charts of LTE subframes showing example locations of LP-WUR wakeup signals in Physical Resource Blocks (PRBs) of the each subframe.
Figure 7B:
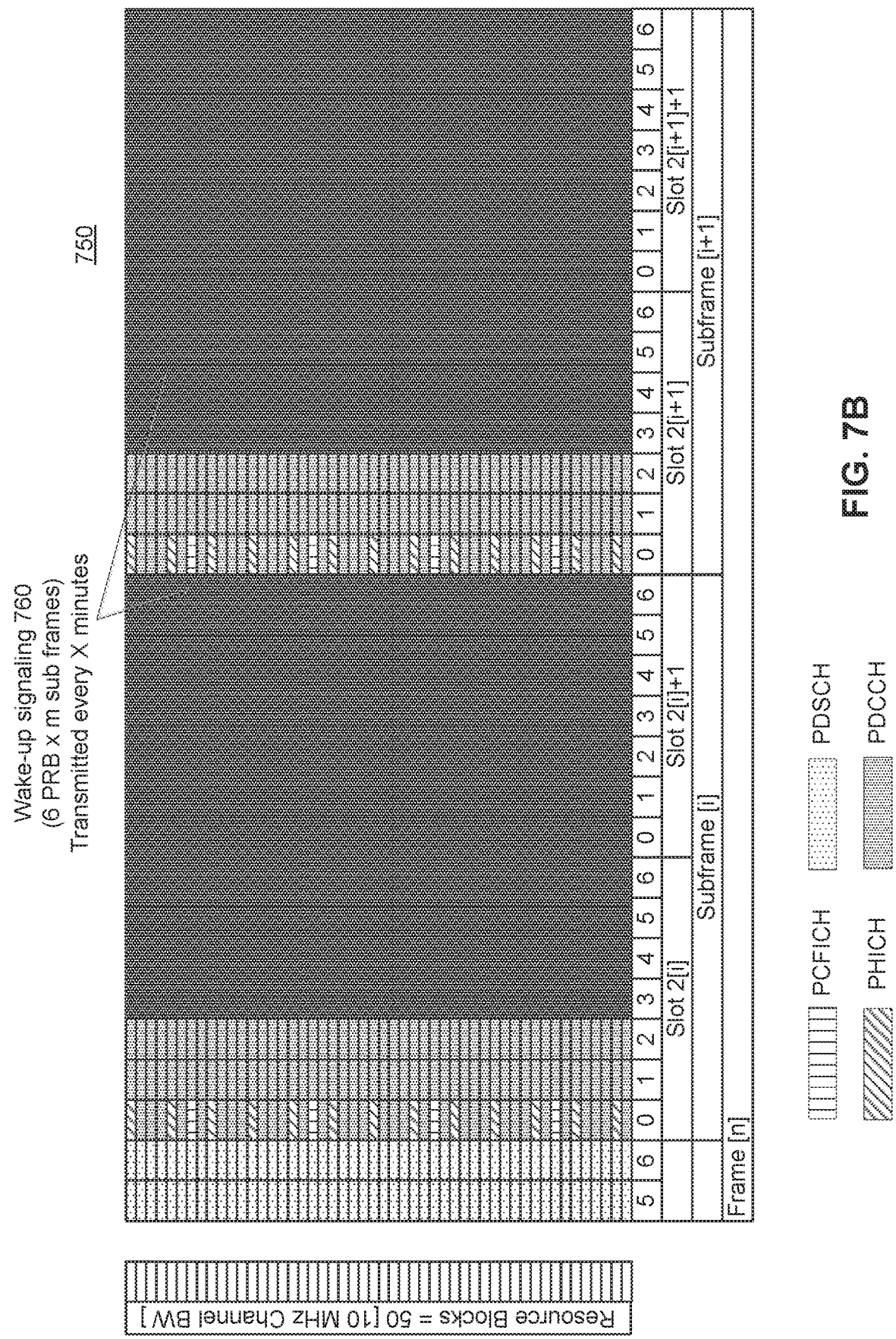

FIG. 7A and FIG. 7B are illustrations of LP-WUR wakeup signal configurations in accordance with some embodiments. A downlink signal configuration 700 is illustrated in FIG. 7A, including Primary Synchronization Channel (P-SCH) and Secondary Synchronization Channel (S-SCH) signals. The downlink signal configuration 700 includes PRBs allocated for a Physical Control Format Indicator Channel (PCFICH), a Physical HARQ Indication channel (PHICH), a PDSCH and a PDCCH. Other downlink channel signals may be included in other embodiments (e.g., Physical Broadcast Channel (PBCH) signal data).

In this embodiment, a LP-WUR wake up signal configuration 710 is shown as using a limited amount of PRBs in a fixed location of the primary band. As shown in this embodiment, the LP-WUR wake up signal configuration 710 comprises n PRBs×m subframes, which may be transmitted every X minutes (dependent on the expected latency of the UE; as discussed above, IoT UEs may have a high expected latency).

Other LP-WUR wake up signal configurations may be used in other embodiments. For example, a downlink signal configuration 750 is illustrated in FIG. 7B as including a LP-WUR wake up signal configuration 760 that uses a narrow frequency channel. In this example, the LP-WUR wake up signal configuration 760 comprises a low number of PRBs (in this example, 6 PRBs)×m subframes, which may be transmitted every X minutes if no response from the UE is received (dependent on the expected latency of the UE). Other examples not illustrated include LP-WUR wake up signal configurations included in a pre-determined Out-Of-Band (OOB) or in the guard bands of primary or secondary bands. These example configurations allow for an extremely simple, yet uniquely identifiable LP-WUR wakeup radio signal such that the power costs of receiving and decoding it correctly over mobile broadband may be extremely low.

V. Additional Details on Devices

Figure 8:
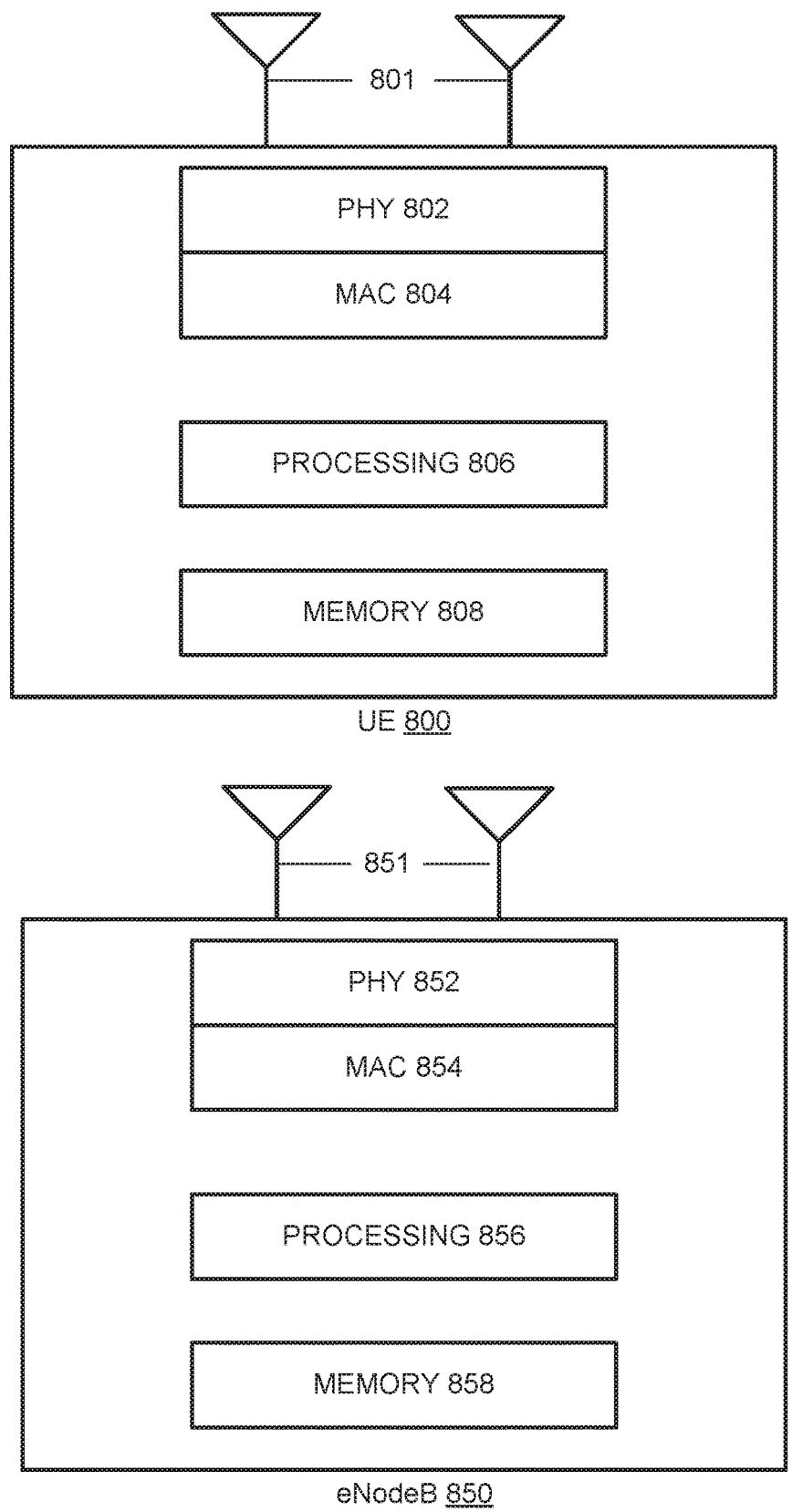
FIG. 8 is a pair of block diagrams of a UE and an eNB.

FIG. 8 shows a block diagram of a UE 800 and an eNB 850, in accordance with some embodiments. It should be noted that in some embodiments, the eNB 850 can be a stationary (non-mobile) device. The UE 800 can include PHY 802 for transmitting and receiving signals to and from the eNB 850, other eNBs, other UEs, or other devices using one or more antennas 801, while the eNB 850 can include PHY 852 for transmitting and receiving signals to and from the UE 800, other eNBs, other UEs, or other devices using one or more antennas 851. The UE 800 can also include MAC circuitry 804 for controlling access to the wireless medium, while the eNB 850 can also include MAC circuitry 854 for controlling access to the wireless medium. The UE 800 can also include processing circuitry 806 and memory 808 arranged to perform the operations described herein, and the eNB 850 can also include processing circuitry 856 and memory 858 arranged to perform the operations described herein.

The antennas 801, 851 can comprise one or more directional or omnidirectional antennas, including, for example, dipole antennas, monopole antennas, patch antennas, loop antennas, microstrip antennas or other types of antennas suitable for transmission of RF signals. In some Multiple-Input Multiple-Output (MIMO) embodiments, the antennas 801, 851 can be effectively separated to benefit from spatial diversity and the different channel characteristics that can result.

Although the UE 800 and eNB 850 are each illustrated as having several separate functional elements, one or more of the functional elements can be combined and can be implemented by combinations of software-configured elements, such as processing elements including DSPs, and/or other hardware elements. For example, some elements can comprise one or more microprocessors, DSPs, Field-Programmable Gate Arrays (FPGAs), Application Specific Integrated Circuits (ASICs), RF ICs (RFICs), and combinations of various hardware and circuitry for performing at least the functions described herein. In some embodiments, the functional elements can refer to one or more processes operating on one or more processing elements.

Figure 9:
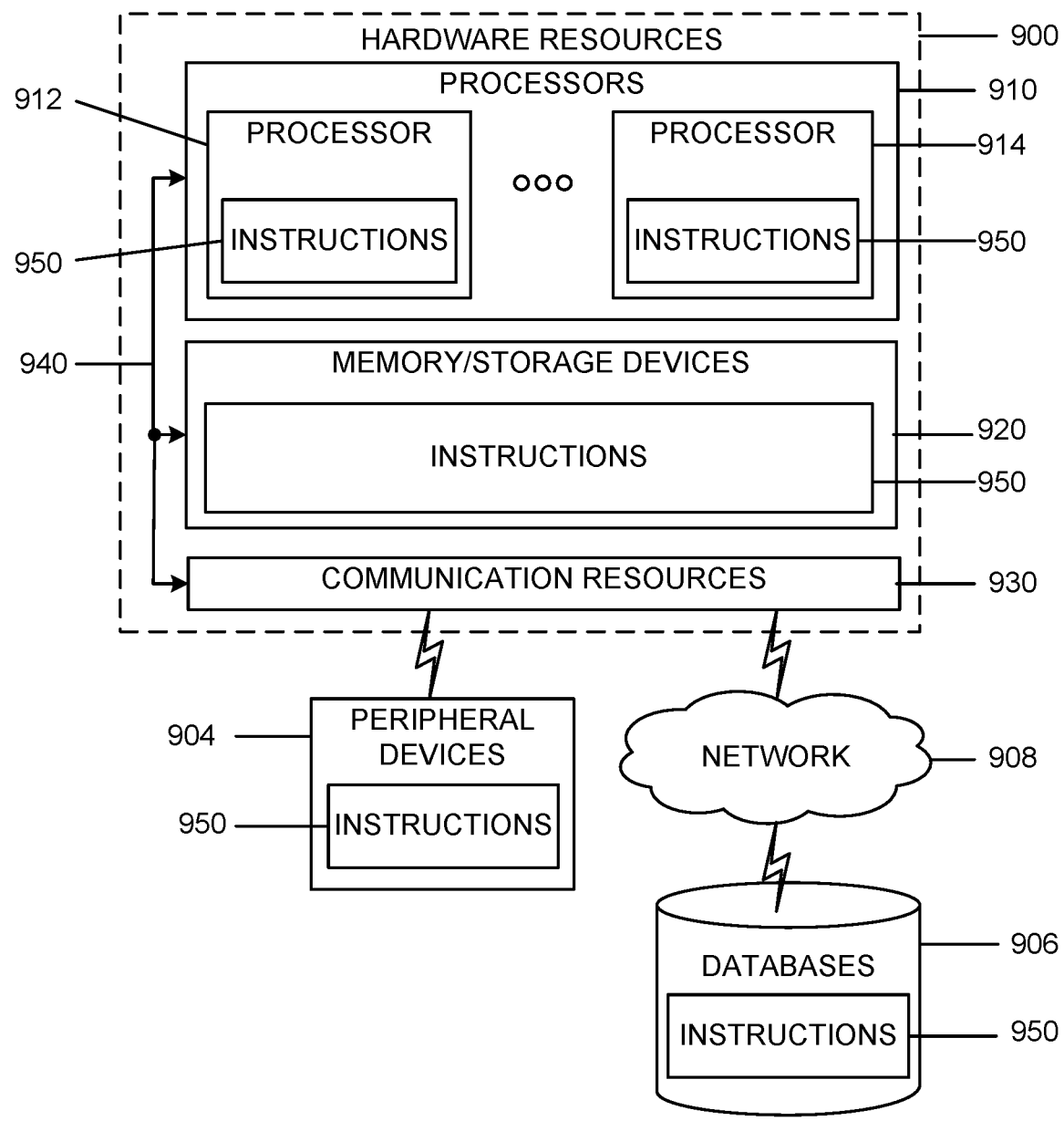
FIG. 9 is a block diagram illustrating components of a machine, according to some example embodiments, able to read instructions from a machine-readable medium and perform one or more of the methods discussed herein.

Embodiments can be implemented in one or a combination of hardware, firmware, and software. Embodiments can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media. Some embodiments can include one or more processors and can be configured with instructions stored on a computer-readable storage device. FIG. 9, for example, is a block diagram illustrating components, according to some example embodiments, able to read instructions from a machine-readable or computer-readable medium (e.g., a machine-readable storage medium) and perform any one or more of the methodologies discussed herein. In some embodiments, the components may be included in a UE or an eNB configured to operate in accordance with 3GPP standards (e.g., LTE-A standard). In some embodiments, the mobile device or other device can be configured to operate according to other protocols or standards, including IEEE 802.11 or other IEEE and 3GPP standards.

Specifically, FIG. 9 shows a diagrammatic representation of hardware resources 900 including one or more processors (or processor cores) 910, one or more memory/storage devices 920, and one or more communication resources 930, each of which are communicatively coupled via a bus 940.

The processors 910 (e.g., a CPU, a Reduced Instruction Set Computing (RISC) processor, a Complex Instruction Set Computing (CISC) processor, a Graphics Processing Unit (GPU), a DSP such as a baseband processor, an ASIC, an RFIC, another processor, or any suitable combination thereof) may include, for example, a processor 912 and a processor 914. The memory/storage devices 920 may include main memory, disk storage, or any suitable combination thereof.

The communication resources 930 may include interconnection and/or network interface components or other suitable devices to communicate with one or more peripheral devices 904 and/or one or more databases 906 via a network 908. For example, the communication resources 930 may include wired communication components (e.g., for coupling via a Universal Serial Bus (USB)), cellular communication components, Near Field Communication (NFC) components, Bluetooth® components (e.g., Bluetooth® Low Energy), Wi-Fi components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 and/or the databases 906. Accordingly, the memory of processors 910, the memory/storage devices 920, the peripheral devices 904, and the databases 906 are examples of computer-readable and machine-readable media.

VI. C-WuRx for Reduced Power Consumption During Mobile Data Offloading

Offloading mobile data to unlicensed spectrum, also known as mobile data offloading or Wi-Fi offloading, includes techniques such as LWA and LTE WLAN radio level integration with IP security tunnel (LWIP). Enhancements to these techniques are being actively pursued by standardization bodies of the 3GPP so as to leverage both the high data rates afforded by Wi-Fi and the reliable connectivity afforded by LTE. In the 13th release (Rel-13) of the 3GPP standards, work was completed on changes in protocol specifications that enabled offloading downlink (DL) data over WLAN using LWA. And in an upcoming Rel-14, a goal is to complete changes in protocol specifications that would also enable offloading UL data over WLAN.

Many mobile data offloading techniques, e.g., LWA, LWIP, and the like, attempt to improve throughput performance by exploiting a UE's dual connectivity while maintaining both Wi-Fi and LTE radios in active states, thus increasing the power consumption substantially. LWA and LWIP architectures and protocols, for example, are designed such that there is an expectation of an active bearer between the UE and an eNB. The reason an active bearer is expected is because, currently, downlink and uplink control messages (including information regarding WLAN channel quality measurements) are communicated via the LTE link. Thus, a relatively high power-consuming LTE modem in the UE is maintained in the RRC_CONNECTED state for the duration of the mobile data offloading session, even though the mobile data is being transmitted over the WLAN link using a lower-power WLAN modem.

Another approach for communicating control messages during mobile data offloading is for the UE to send and receive the messages over the WLAN link, which would facilitate offloading UL data over the WLAN and provide an opportunity to enter the RRC_IDLE state. Even under this approach, however, there are still at least two reasons to maintain the UE in the RRC_CONNECTED state. First, maintaining the RRC_CONNECTED state reduces the latency of switching from Wi-Fi offloading back to LTE transmissions. Second, it is challenging to reliably predict occasions in which the WLAN link becomes congested or lacks sufficient coverage, whereas an LTE link provides a reliable connectivity option that enables session continuity in response to a compromised WLAN link, thus improving user experience.

Nevertheless, as noted previously, maintaining the RRC_CONNECTED state has inhibited the UE from entering lower power states, even when its data exchanges occur over the WLAN link. Furthermore, while in the RRC_CONNECTED state, the UE may enter DRX state, but it will still consume more energy than it would have otherwise consumed in (non-offloading) lower-power idle states.

Disclosed are techniques that enable a UE to retain low latency access to the WWAN, but at a lower power consumption state—lower than even that of an RRC_IDLE state—while exchanging data over a WLAN link and while allowing the UE to switch at a low latency back to using its WWAN link. Embodiments of a low-power C-WuRx provide a low-latency, low-power solution for the UE to switch from WLAN to WWAN when desired.

More specifically, when the eNB offloads both UL and DL data exchange to the WLAN link, rather than letting the LTE link be in a C-DRX energy saving state (based on inactivity timer settings), the LTE radio is completely shut down and a very low-power, low-latency C-WuRx is instead used to manage the state of the LTE link in response to a narrowband wakeup signal. In other words, the C-WuRx is used to wake up the main modem when the eNB decides that switching from WLAN link utilization to LTE link utilization is desirable. And when the UE seeks to transmit control traffic over the UL, then the UE may simply activate the LTE modem and send the traffic as if it were normally transitioning out its low-power mode of a conventional C-DRX implementation.

There are various reasons for why the UE may seek to send control messages. For example, the UE may want to ensure that its LTE connection is not prematurely disconnected after the connection has been inactive on the LTE channel for too long. In LTE systems, the eNB maintains an inactivity timer that transitions the UE from an RRC_CONNECTED state to an RRC_IDLE state if the eNB does not receive anything from the UE (i.e. data requests) for a predetermined period of time. Accordingly, in some embodiments the eNB may also suspend this inactivity timer during the C-WuRx active state since this timer value is typically in the range of 10-12 seconds whereas the offloading to the WLAN may last longer than that.

LTE system convey control information through various means. For example, both UL and DL control information may be sent using RRC control messages. Typically, UL control information from the UE is currently sent through LTE links. But in some embodiments when there is no data being transferred over LTE, then no LTE control information would be exchanged over LTE. Accordingly, control information may be sent either over the WLAN, or the UE will wake up the LTE radio to send it.

Figure 10:
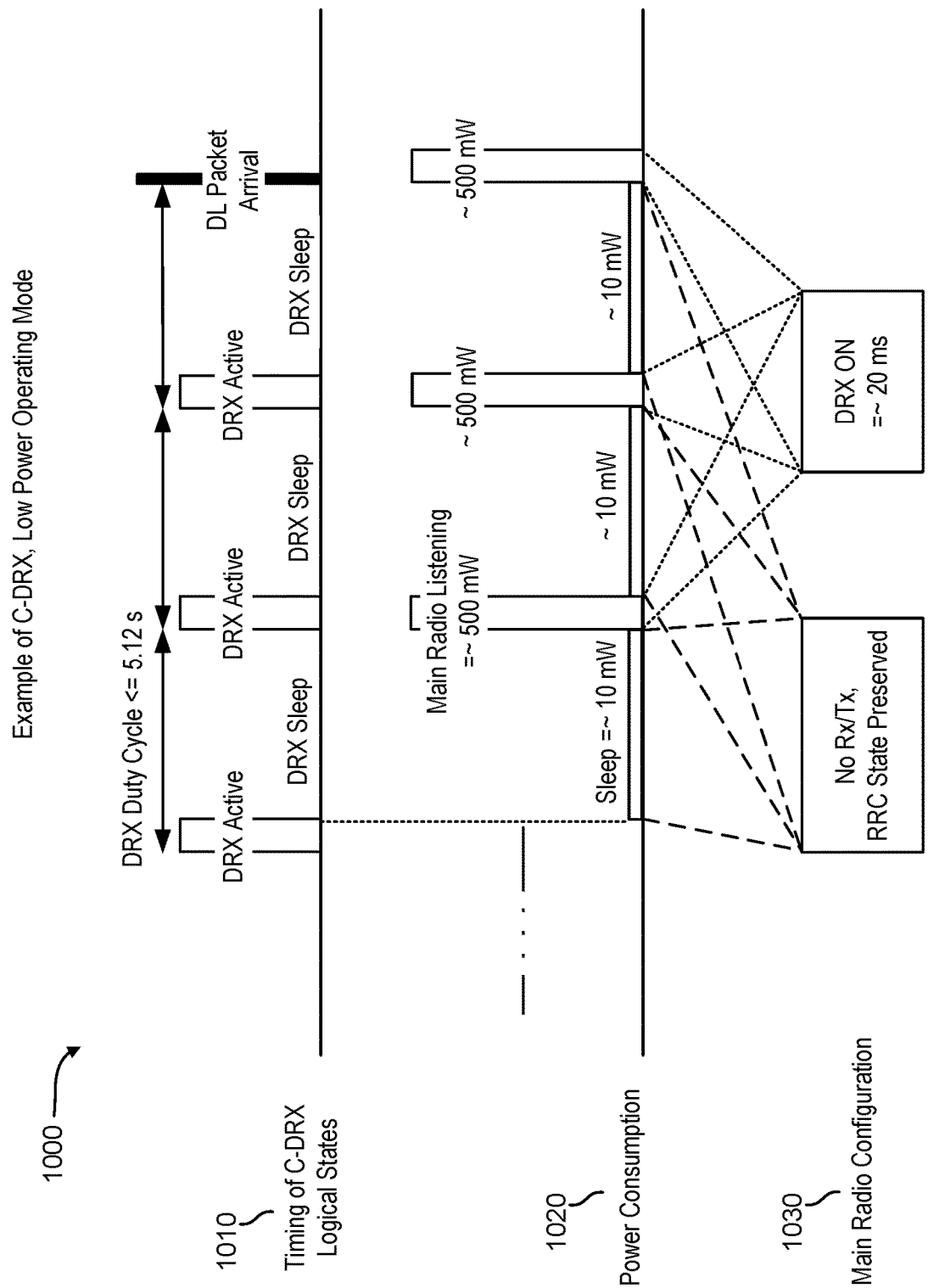
FIG. 10 is a series of three timing, power consumption, and radio configuration graphs showing conventional behavior of a UE in a Connected mode of Discontinuous Reception (C-DRX).

FIG. 10 shows example diagrams 1000 of timing 1010, power consumption 1020, and main radio configurations 1030 of a UE performing C-DRX while in the RRC_CONNECTED state. The LTE radio powers down in low-power (sleep) states, but since the UE preserves all of the RRC state information, as well as maintains timing synchronization with the LTE network, the power consumption in the low-power states is still fairly high, e.g., around 10 milliwatts (mW). And when the UE activates its main radio for the active duration period of C-DRX, which is typically in the order of 10 milliseconds (ms) plus additional time for the hardware to power up, the main radio consumes a relatively high amount of power (e.g., about 500 mW) so as to monitor the PDCCH in each sub-frame. Note, however, that these power consumption numbers are rather optimistic, based on ideal conditions and optimized versions of a typical LTE modem. In actual practice, power consumption in the low- and high-power states is closer to, respectively, about 40 mW and about 600 mW.

FIG. 10 also shows that, to further reduce power consumption during C-DRX, the period of the DRX duty cycle may be extended up to about 5.12 seconds. This change, however, would cause a significant latency gap.

Figure 11:
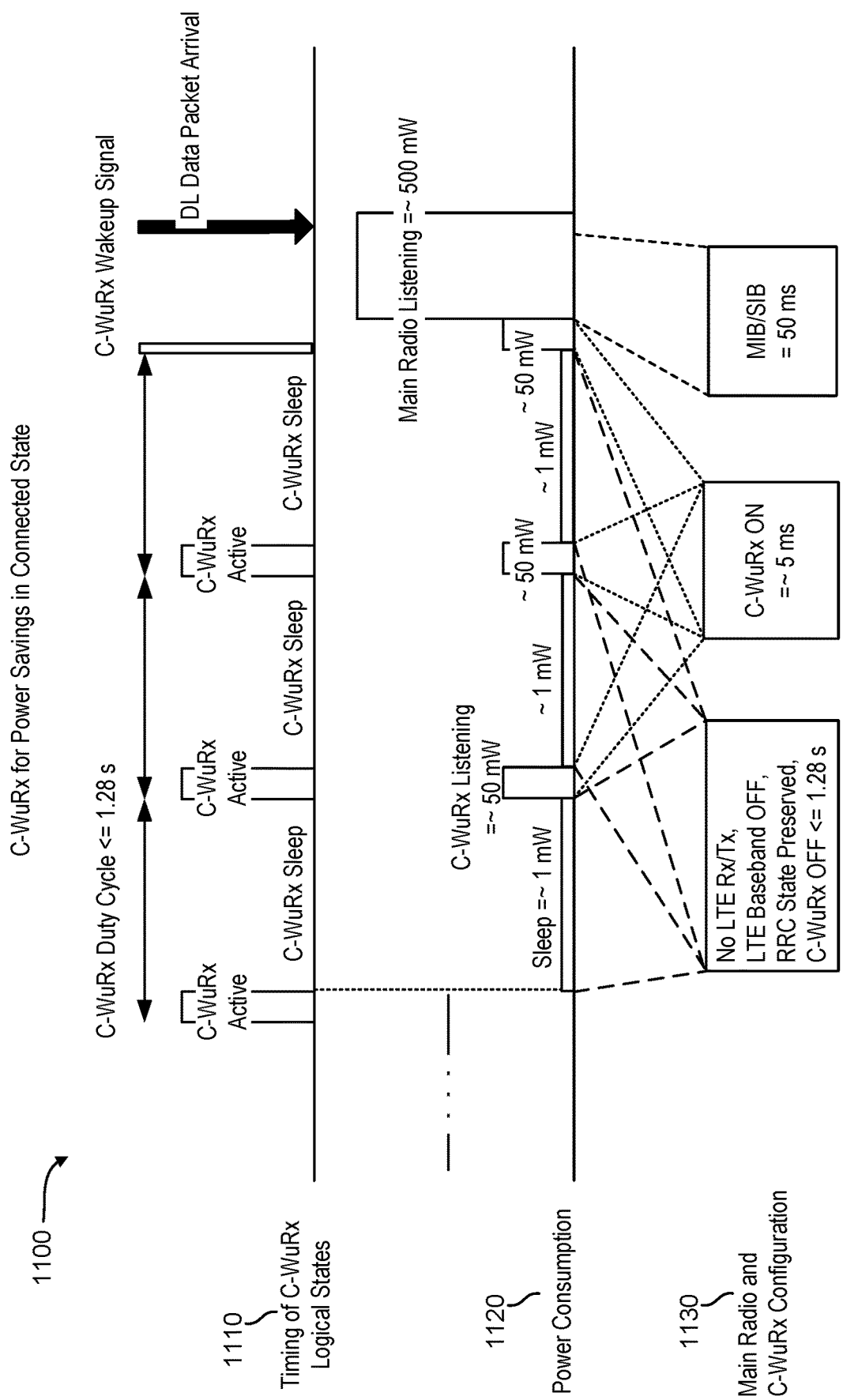
FIG. 11 is another series of three timing, power consumption, and radio configuration graphs showing how a C-WuRx reduces power consumption while preserving a connection state of a main radio.

FIG. 11 shows example diagrams 1100 of timing 1110, power consumption 1120, and main radio and C-WuRx configurations 1130. Compared to FIG. 10, the diagrams 1100 show the results of an improved power-saving solution employing a C-WuRx to monitor the LTE channel for a wakeup signal described previously. Instead of keeping a power-hungry LTE receiver active, it is deactivated and the RRC state information is preserved. In other words, during the period in which the C-WuRx is on, the LTE receiver is no longer time synchronized with the LTE channel, but the C-WuRx is still able to read the wakeup signal and ignore the rest of the complex LTE channel (with its fairly tight synchronization and highly complex processing demands) so as to consume very little energy when reading the wakeup signal.

Furthermore, FIG. 11 shows that the C-WuRx may also be (duty) cycled at shorter periodicity that that of conventional C-DRX, but it still saves energy compared to the intermitted use of the LTE receiver. For example, when there is data or a message to transmit, the eNB sends a wakeup signal first to the UE instead of waiting to send the message until the next DRX active period. And when the wakeup signal arrives, the C-WuRx wakes up the LTE receiver. At that point, since the UE is no longer time synchronized, the UE spends some additional time, i.e., in a range from about 50 ms to about 100 ms, to read the MIB and System Information Block1 (SIB1) and obtain timing synchronization that enables the UE to read the PDCCH scheduling the DL packet transmission. The small delay in obtaining timing synchronization does not materially impact the overall latency and power reduction due to the C-WuRx having a faster duty cycle. For example, based on the timing and power consumption values shown in FIGS. 10 and 11, a maximum period of 1.28 s in C-WuRx yields a nine-fold energy savings compared to a typical C-DRX implementation having a period of 2.56 s.

There are currently two power saving states in LTE: one is DRX during the RRC_CONNECTED state and the other is paging during the RRC_IDLE state. To employ the C-WuRx during the C-DRX state, the UE may want to wake up sooner than every 2.56 seconds because the UE is connected and may desire improved latency. In contrast, if the UE is in the RRC_IDLE state, it might tolerate more latency delay because it likely does not have any active applications running. According to some embodiments, therefore, a C-WuRx substitutes for paging and saves about 10 times more energy during the RRC_IDLE state. In another embodiment, a C-WuRx can also be used during a C-DRX state to provide low-power consumption at very low latency during LWA. These capabilities enable the LTE link to be readily accessible at low latency, yet also be maintained at extremely low power consumption, similar to as if the LTE link were in an RRC_IDLE state instead of an RRC_CONNECTED state.

The C-WuRx is more preferred over C-DRX in cases where no or limited data is being exchanged over the WWAN (e.g., LTE) link. This is so because the C-WuRx expects the eNB to send a short wakeup signal before it sends a DL packet or messages to the UE. As noted previously, the wakeup signal may occupy 2-6 PRBs. This is not a significant use of air-interface resources, particularly if the signal is used infrequently as in the case when the WWAN link is simply acting as a backup link for data primarily being sent over the WLAN link (e.g., while data has been offloaded to the WLAN). But in cases where WWAN air-interface resources are less abundantly available, a UE may optionally elect to employ C-DRX in lieu of C-WuRx techniques.

Figure 12:
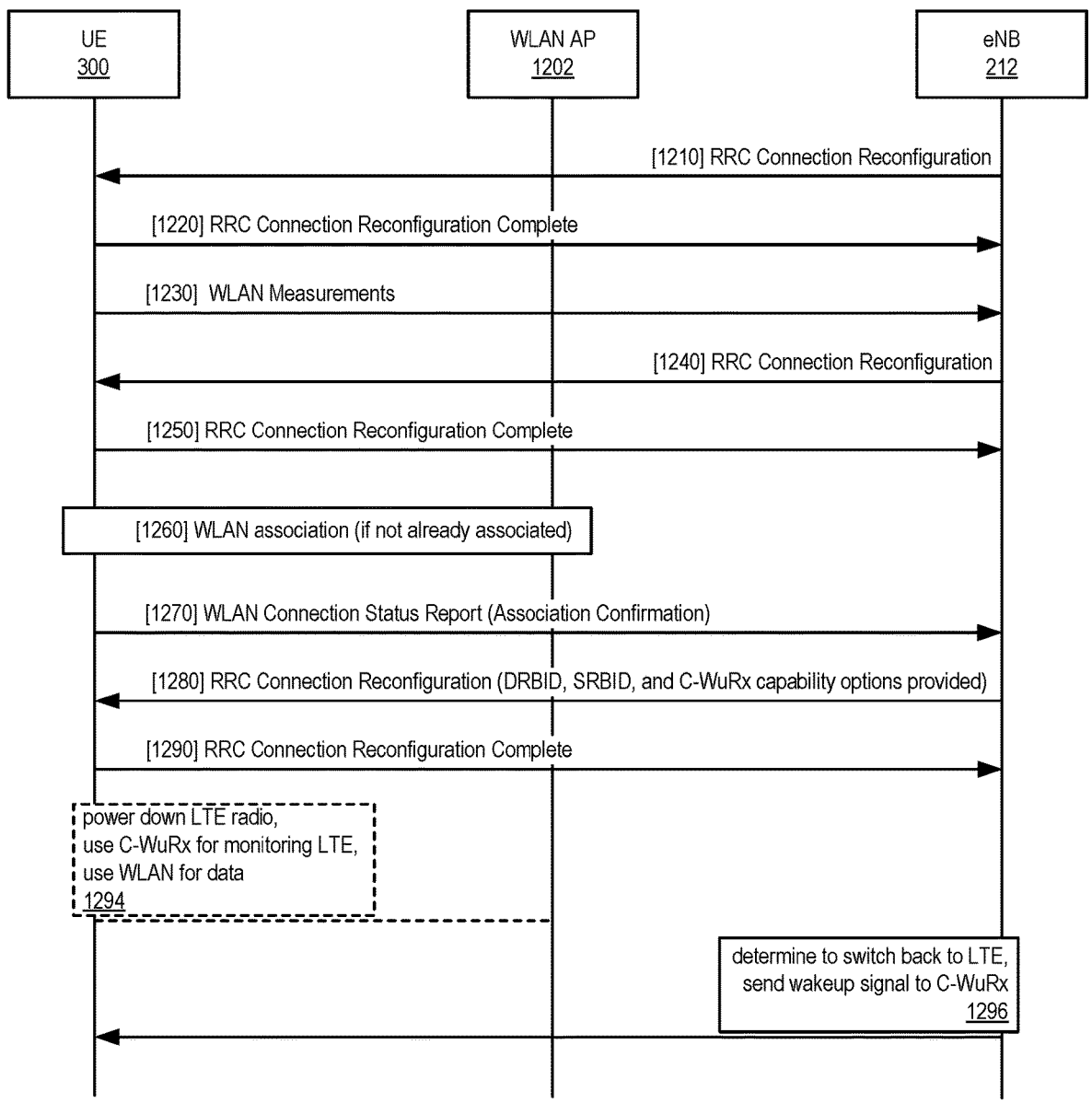
FIG. 12 is a sequence diagram showing example Radio Resource Control (RRC) message exchange for eNB-initiated WLAN offload and LTE link power-down.

FIG. 12 shows an example sequence 1200 of the UE 300 and the eNB 212 exchange RRC messages to deploy C-WuRx capabilities available on the UE 300. For example, the UE 300 and the eNB first negotiate the capability of the UE to use the C-WuRx while the UE 300 is connected to a Wi-Fi access point 1202 and maintains the WWAN link in the RRC_CONNECTED state. The UE 300 signals to the eNB 212 that the UE 300 will expect to be sent a wakeup signal. Details concerning additional C-WuRx parameters are also exchanged. Examples of parameters specified between the UE and the eNB for C-WuRx in the RRC_CONNECTED state are as follows.

First, a duty cycle for C-WuRx may be provided. This parameter may specify ON and OFF period durations in terms of radio frames, which in LTE last one ms.

Second, an offset, i.e., from a time at which the UE signals that it is shutting down the LTE receiver, is provided to ensure that the UE and the eNB are aligned in terms of when the C-WuRx starts its duty cycle, especially when multiple UEs within the cell share the same C-WuRx cycle. Similarly, when the UE 300 receives a wakeup signal, an offset time is provided indicating when the UE's LTE receiver is back in operation after a predictable period of time (depending on hardware circuitry and implementation of C-WuRx functionality on the modem).

Third, a triggering mechanism for deploying the C-WuRx is provided to specify conditions under which the C-WuRx activates. The trigger may also include an inactivity timer value similar to those used for DRX. In some embodiments, the trigger is a message from the eNB, or it may be triggered in response to elapsed time tracked through a timer. The C-WuRx active state is not assumed to be entered until its trigger condition for operation during RRC_CONNECTED state, i.e., complete UL/DL data offload to WLAN, has been achieved and the eNB does not expect any WLAN measurements at any frequency.

With reference to FIG. 12, after the initial capability exchange to determine support for LWA capability (not shown), the steps 1210-1270 show the steps of establishing the WLAN link and exchange of information concerning the use of link for mobile data offloading. The eNB's Wi-Fi offloading decision module may then make a decision to use WLAN link for all of the data traffic transmissions.

To enable the eNB to transmit both data and control messages to the UE using the WLAN link, the eNB creates Data Radio Bearer Identifiers (DRBIDs) and Signaling Radio Bearer Identifiers (SRBIDs) for both UL and DL. At step 1280, the eNB communicates this information to the UE through RRC messages using the LTE control channel link. In addition, if the C-WuRx capability was previously negotiated between UE and eNB (as described previously), the eNB sends C-WuRx parameters for the RRC_CONNECTED state in the RRC Connection Reconfiguration message.

At step 1294, the UE's C-WuRx is triggered to turn on and the main LTE receiver is turned off. This allows the UE to save power otherwise expended on the LTE link while still monitoring (with a low-power and low-latency mechanism) at least a portion of the LTE channel conveying the wakeup signal.

Note that, as far as the eNB is concerned, the UE is still in RRC_CONNECTED mode during and following the process of powering down the LTE radio. Thus, the UE need not use additional RRC messages to reestablish its connection with the eNB—it simply wakes up its LTE radio in response to receiving a wakeup signal, obtains synchronization with the LTE network, and resumes receiving control channel information and other DL messages from the eNB.

Based on the control information from the UE, which may include a measure of the WLAN link quality, the eNB may elect to once again send 1296 a DL message to the UE over the LTE link instead of offloading such messages through the WLAN link. To do so, the eNB initially sends a wakeup signal to the C-WuRx. Then, the eNB waits a predetermined period of time, i.e., allowing for the C-WuRx to trigger the powering up of its LTE radio. Finally, the eNB then sends the DL message in the same manner it would have sent the DL message as if the UE were in its DRX ON duration period.

In another embodiment, after its LTE radio is ready, the UE may send a Scheduling Request message to signal to the eNB that the wakeup was successful, i.e., the UE is available to receive the DL message from the eNB.

VII. Example Embodiments

1. An apparatus of a user equipment (UE) that facilitates reduced power consumption during link aggregation of wireless wide area network (WWAN) and wireless local area network (WLAN) links, the UE comprising: a WWAN radio to receive through the WWAN link control information from a base station and, in response to link aggregation, enter a power saving mode (PSM) of the WWAN radio; a WLAN radio to communicate through the WLAN link so as to offload user data transmissions from the base station; and a cellular wakeup receiver (C-WuRx) to receive a wakeup signal provided from the base station to wake up the WWAN radio by causing the UE to exit the PSM of the WWAN radio and configure the WWAN radio to resume receiving the control information from the base station. For example, the control information is the PDCCH scheduling the DL packet transmission that will arrive through the WWAN link.

2. The apparatus of any other example, in which the C-WuRx is configured to receive the wakeup signal by periodically monitoring at least of portion of a downlink channel from the base station.

3. The apparatus of any other example, in which the link aggregation comprises Long Term Evolution (LTE)-WLAN aggregation (LWA).

4. The apparatus of any other example, in which the WWAN radio is a main LTE radio modem.

5. The apparatus of any other example, in which the WLAN radio is a Wi-Fi radio.

6. The apparatus of any other example, in which one or more of the WLAN radio, the WWAN radio, or the C-WuRx are integrated in a system on a chip (SoC).

7. The apparatus of any other examples, further comprising processing circuitry to generate a radio resource control (RRC) message for indicating during capability exchange with the base station that the UE includes the C-WuRx suitable for reduced power consumption.

8. The apparatus of any other example, further comprising: a memory storage device; and processing circuitry to generate radio resource control (RRC) state information representing a connected state (RRC_CONNECTED) of the WWAN link for maintaining the RRC state information in the memory storage device during link aggregation.

9. A non-transitory computer-readable storage medium comprising contents, which when executed by a computing system, cause the computing system to perform operations to: generate signal data to be transmitted through a cellular connection with an evolved universal terrestrial radio access network (E-UTRAN) Node B (eNB), the signal data indicating a user equipment (UE) includes low power wakeup radio (LP WUR); process LP-WUR configuration parameters received from the eNB, the LP WUR configuration parameters for monitoring a wakeup signal to be received by the LP-WUR during mobile data offloading in which user data and control traffic are offloaded from the cellular connection to a wireless internet connection provided by a wireless access point; store a state of the cellular connection and cause a front end module (FEM) of the UE to reduce its power consumption by ceasing reception of a downlink channel of the cellular connection in response to the user data and control traffic being offloaded; and in response to the LP-WUR receiving the wakeup signal from the eNB, restore the state of the cellular connection and cause the FEM to resume reception of the downlink channel of the cellular connection.

10. The non-transitory computer-readable storage medium of any other example, further comprising contents, which when executed by the computing system, cause the computing system to perform operations to process the LP-WUR configuration parameters including a time interval parameter by which to configure the LP-WUR to periodically check for the wakeup signal.

11. The non-transitory medium of any other example, in which the UE comprises a machine-type communications (MTC) device.

12. The non-transitory medium of any other example, in which the UE comprises a cellular Internet of Things (CIoT) UE.

13. The non-transitory computer-readable storage medium of any of any other example, further comprising contents, which when executed by the computing system, cause the computing system to perform operations to, in response to the FEM receiving the downlink channel of the cellular connection, process a master information block (MIB) and system information block1 (SIB1) to obtain timing synchronization that enables the UE to read a physical downlink control channel (PDCCH) scheduling a downlink packet transmission.

14. The non-transitory computer-readable storage medium of any other example, further comprising contents, which when executed by the computing system, cause the computing system to perform operations to process data radio bearer identifiers (DRBIDs) and signaling radio bearer identifiers (SRBIDs).

15. The non-transitory computer-readable storage medium of any other example, further comprising contents, which when executed by the computing system, cause the computing system to perform operations to generate a scheduling request message to signal to the eNB that the FEM is configured to resume reception of the downlink channel.

16. An apparatus for a user equipment (UE), comprising: a first radio for communicating wirelessly with a base station providing a wireless wide area network (WWAN); a second radio for mobile data offloading to a wireless access point providing a wireless local area network (WLAN); and a cellular wakeup receiver (C-WuRx) configured to receive a wakeup signal from a base station, the wakeup signal indicating that the C-WuRx should cause to first radio to transition from a low power consumption state during the mobile data offloading to a nominal power consumption state for communicating wirelessly with a base station.

17. The apparatus of any other example, in which the wakeup signal is modulated according to an on-off keying (OOK) tone.

18. The apparatus of any other example, in which the wakeup signal is provided in a predetermined physical resource block (PRB) location, the predetermined PRB location to comprise a location within a long term evolution (LTE) frequency band.

19. The apparatus of any other example, in which the wakeup signal is included in a narrow frequency band of a downlink channel.

20. The apparatus of any other example, in which the C-WuRx is configured to cycle between an active state for receiving the wakeup signal and a sleep state in which the C-WuRx consumes less power than that of the active state and does not receive wireless signals.

21. The apparatus of any other example, in which the C-WuRx is configured provide an actuation signal to the first radio in response to receiving the wakeup signal.

22. A cellular wakeup receiver (C-WuRx) for reducing power consumption of a wireless wide area network (WWAN) radio of a user equipment (UE), the C-WuRx comprising: receiver circuitry to receive a wakeup signal from a base station in response to the UE performing link aggregation by which downlink communications from the base station are offloaded to a wireless local area network (WLAN); and processing circuitry to: configure the receiver circuitry to periodically monitor at least a portion of a WWAN band for the wakeup signal; and process the wakeup signal to cause the WWAN radio to resume receiving the downlink communications from the base station.

23. The C-WuRx of any other example, in which the processing circuitry is configured to cycle the receiver circuitry between active and sleep states.

24. The C-WuRx of any other example, in which the processing circuitry is configured to generate an electrical signal received by the WWAN radio that causes the WWAN radio to resume receiving the downlink communications.

25. A method for reducing power consumption in user equipment (UE), comprising: generating signal data to be transmitted through a cellular connection with an evolved universal terrestrial radio access network (E-UTRAN) Node B (eNB), the signal data indicating the UE includes low power wakeup radio (LP WUR); processing LP-WUR configuration parameters received from the eNB, the LP WUR configuration parameters for monitoring a wakeup signal to be received by the LP-WUR during mobile data offloading in which user data and control traffic are offloaded from the cellular connection to a wireless internet connection provided by a wireless access point; storing a state of the cellular connection and cause a front end module (FEM) of the UE to reduce its power consumption by ceasing reception of a downlink channel of the cellular connection in response to the user data and control traffic being offloaded; and in response to the LP-WUR receiving the wakeup signal from the eNB, restoring the state of the cellular connection and causinge the FEM to resume reception of the downlink channel of the cellular connection.

26. The method of any other example, further comprising processing the LP-WUR configuration parameters including a time interval parameter by which to configure the LP-WUR to periodically check for the wakeup signal.

27. The method of any other example, in which the UE comprises a machine-type communications (MTC) device.

28. The method of any other example, in which the UE comprises a cellular Internet of Things (CIoT) UE.

29. The method of any other example, further comprising, in response to the FEM receiving the downlink channel of the cellular connection, processing a master information block (MIB) and system information block1 (SIB1) to obtain timing synchronization that enables the UE to read a physical downlink control channel (PDCCH) scheduling a downlink packet transmission.

30. The method of any other example, further comprising processing data radio bearer identifiers (DRBIDs) and signaling radio bearer identifiers (SRBIDs).

31. The method of any other example, further comprising generating a scheduling request message to signal to the eNB that the FEM is configured to resume reception of the downlink channel.

32. A method, performed by cellular wakeup receiver (C-WuRx), for reducing power consumption of a wireless wide area network (WWAN) radio of a user equipment (UE), the method comprising: receiving though receiver circuitry of the UE a wakeup signal from a base station in response to the UE performing link aggregation by which downlink communications from the base station are offloaded to a wireless local area network (WLAN); configuring the receiver circuitry to periodically monitor at least a portion of a WWAN band for the wakeup signal; and processing the wakeup signal to cause the WWAN radio to resume receiving the downlink communications from the base station.

33. The method of any other example, further comprising cycling the receiver circuitry between active and sleep states.

34. The method of any other example, further comprising generating an electrical signal received by the WWAN radio that causes the WWAN radio to resume receiving the downlink communications.

35. An apparatus comprising means to perform one or more elements of a method described in or related to any other example, and/or any other method or process described herein.

36. One or more non-transitory (or transitory) computer-readable media comprising instructions to cause an electronic device, upon execution of the instructions by one or more processors of the electronic device, to perform one or more elements of a method described in or related to any other example, and/or any other method or process described herein.

37. An apparatus comprising control logic, transmit logic, and/or receive logic to perform one or more elements of a method described in or related to any other example, and/or any other method or process described herein.

38. A method of communicating in a wireless network as shown and described herein.

39. A system for providing wireless communication as shown and described herein.

40. A device for providing wireless communication as shown and described herein.

VIII. Concluding Remarks

Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. Skilled persons will understand that many changes may be made to the details of the above-described embodiments without departing from the underlying principles of the invention. The scope of the present invention should, therefore, be determined only by patent claims.

The invention claimed is:

1. An apparatus of a user equipment (UE) that facilitates reduced power consumption during link aggregation of wireless wide area network (WWAN) and wireless local area network (WLAN) links, the UE comprising:
 a WWAN radio to receive through the WWAN link control information from a base station and, in response to link aggregation, enter a power saving mode (PSM) of the WWAN radio, the link aggregation comprising Long Term Evolution (LTE)-WLAN aggregation (LWA);

a WLAN radio to communicate through the WLAN link so as to offload user data transmissions from the base station;

a cellular wakeup receiver (C-WuRx) to receive a wakeup signal provided in a Physical Resource Block (PRB) transmitted from the base station to wake up the WWAN radio by causing the UE to exit the PSM of the WWAN radio and configure the WWAN radio to resume receiving the control information from the base station; and processing circuitry to generate a radio resource control (RRC) message for indicating during capability exchange with the base station that the UE includes the C-WuRx suitable for reduced power consumption.

2. The apparatus of claim 1, in which the C-WuRx is configured to receive the wakeup signal by periodically monitoring at least of portion of a downlink channel from the base station.

3. The apparatus of claim 1, in which the WWAN radio is a main LTE radio modem.

4. The apparatus of claim 1, in which the WLAN radio is a Wi-Fi radio.

5. The apparatus of claim 1, in which one or more of the WLAN radio, the WWAN radio, or the C-WuRx are integrated in a System On a Chip (SoC).

6. The apparatus of claim 1, further comprising:
a memory storage device; and
in which the processing circuitry is configured to generate RRC state information representing a connected state (RRC_CONNECTED) of the WWAN link for maintaining the RRC state information in the memory storage device during link aggregation.

7. A non-transitory computer-readable storage medium comprising contents, which when executed by a computing system, cause the computing system to perform operations to:
generate a radio resource control (RRC) message to be transmitted through a cellular connection with an evolved universal terrestrial radio access network (E-UTRAN) Node B (eNB), the RRC message indicating during capability exchange that a user equipment (UE) includes low-power wakeup radio (LP-WUR);
process LP-WUR configuration parameters received from the eNB, the LP-WUR configuration parameters for monitoring a wakeup signal to be received by the LP-WUR during mobile data offloading in which user data and control traffic are offloaded from the cellular connection to a wireless Internet connection provided by a wireless access point;
store a state of the cellular connection and cause a front end module (FEM) of the UE to reduce its power consumption by ceasing reception of a downlink channel of the cellular connection in response to the user data and control traffic being offloaded; and
in response to the LP-WUR receiving the wakeup signal from the eNB, restore the state of the cellular connection and cause the FEM to resume reception of the downlink channel of the cellular connection.

8. The non-transitory computer-readable storage medium of claim 7, further comprising contents, which when executed by the computing system cause the computing system to perform operations to process the LP-WUR configuration parameters including a time interval parameter by which to configure the LP-WUR to periodically check for the wakeup signal.

9. The non-transitory computer-readable storage medium of claim 7, in which the UE comprises a machine-type communications (MTC) device.

10. The non-transitory computer-readable storage medium of claim 7, in which the UE comprises a cellular Internet of Things (CIoT) UE.

11. The non-transitory computer-readable storage medium of claim 7, further comprising contents, which when executed by the computing system cause the computing system to perform operations to, in response to the FEM receiving the downlink channel of the cellular connection, process a master information block (MIB) and system information block1 (SIB1) to obtain timing synchronization that enables the UE to read a physical downlink control channel (PDCCH) scheduling a downlink packet transmission.

12. The non-transitory computer-readable storage medium of claim 7, further comprising contents, which when executed by the computing system cause the computing system to perform operations to process data radio bearer identifiers (DRBIDs) and signaling radio bearer identifiers (SRBIDs).

13. The non-transitory computer-readable storage medium of claim 7, further comprising contents, which when executed by the computing system cause the computing system to perform operations to generate a scheduling request message to signal to the eNB that the FEM is configured to resume reception of the downlink channel.

14. A cellular wakeup receiver (C-WuRx) for reducing power consumption of a wireless wide area network (WWAN) radio of a user equipment (UE), the C-WuRx comprising:
receiver circuitry to receive a wakeup signal from a base station in response to the UE performing link aggregation by which downlink communications from the base station are offloaded to a wireless local area network (WLAN), the link aggregation comprising Long Term Evolution (LTE)-WLAN aggregation (LWA), in which the wakeup signal is provided in a predetermined physical resource block (PRB) location, the predetermined PRB location to comprise a location within an LTE frequency band; and
processing circuitry to:
configure the receiver circuitry to periodically monitor at least a portion of a WWAN band for the wakeup signal; and
process the wakeup signal to cause the WWAN radio to resume receiving the downlink communications from the base station.

15. The C-WuRx of claim 14 in which the processing circuitry is configured to cycle the receiver circuitry between active and sleep states.

16. The C-WuRx of claim 14 in which the processing circuitry is configured to generate an electrical signal received by the WWAN radio that causes the WWAN radio to resume receiving the downlink communications.

17. The C-WuRx of claim 14, in which the wakeup signal is modulated according to an on-off keying (OOK) tone.

18. The C-WuRx of claim 14, in which the wakeup signal is included in a narrow frequency band of a downlink channel.

19. The C-WuRx of claim 14, in which the C-WuRx is configured to cycle between an active state for receiving the wakeup signal and a sleep state in which the C-WuRx consumes less power than that of the active state and does not receive wireless signals.

20. The C-WuRx of claim 14, in which the C-WuRx is configured provide an actuation signal to the WWAN radio in response to receiving the wakeup signal.

\* \* \* \* \*